(12) United States Patent
Park et al.

(10) Patent No.: US 7,572,490 B2
(45) Date of Patent: Aug. 11, 2009

(54) BRIGHTNESS ENHANCEMENT FILM FOR LIQUID CRYSTAL DISPLAY AND MANUFACTURING METHOD THEREOF

(75) Inventors: Jong-Dae Park, Seoul (KR); Jin-Taek Hwang, Daejeon-si (KR); Jin-Sung Choi, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 723 days.

(21) Appl. No.: 11/114,214

(22) Filed: Apr. 26, 2005

(65) Prior Publication Data

US 2005/0275334 A1  Dec. 15, 2005

(30) Foreign Application Priority Data

| Apr. 27, 2004 | (KR) | ...................... 10-2004-0028961 |
| Apr. 27, 2004 | (KR) | ...................... 10-2004-0028962 |
| Apr. 27, 2004 | (KR) | ...................... 10-2004-0028963 |
| Apr. 29, 2004 | (KR) | ...................... 10-2004-0030049 |
| May 6, 2004 | (KR) | ...................... 10-2004-0031734 |

(51) Int. Cl.
*C09K 19/00* (2006.01)
*C09K 19/06* (2006.01)
*C09K 19/56* (2006.01)

(52) U.S. Cl. ...................... 428/1.1; 430/20; 252/299.01; 349/1; 349/2

(58) Field of Classification Search ................ 430/20; 428/1.1; 252/299.01; 349/1, 2
See application file for complete search history.

(56) References Cited

U.S. PATENT DOCUMENTS

| 5,587,816 A | 12/1996 | Gunjima et al. |
| 6,025,897 A | 2/2000 | Weber et al. |
| 6,504,589 B1 * | 1/2003 | Kashima et al. ............... 349/96 |
| 2003/0095400 A1 * | 5/2003 | Kashima et al. ............... 362/31 |

FOREIGN PATENT DOCUMENTS

| CN | 1383002 A | 12/2002 |
| CN | 1409130 A | 4/2003 |
| CN | 2586979 | 11/2003 |
| JP | 2002-318311 | 10/2002 |
| JP | 2003-167127 | 6/2003 |
| JP | 2003-195054 | 7/2003 |
| JP | 2003-215570 | 7/2003 |
| KR | 1991-0005080 | 3/1991 |
| KR | 1998-0086682 | 12/1998 |
| KR | 2000-0064660 | 11/2000 |

* cited by examiner

*Primary Examiner*—Geraldina Visconti
(74) *Attorney, Agent, or Firm*—F. Chau & Associates, LLC

(57) ABSTRACT

A liquid crystal display having a brightness enhancement film and a method of manufacturing the brightness enhancement film, the method including providing a solution of high molecular weight resin on a high molecular weight film, uniformly distributing the solution of high molecular weight resin on the high molecular weight film, and drying the solution of high molecular weight resin to form a high molecular weight resin layer, wherein the high molecular weight resin layer has a hexagonal lattice structure.

17 Claims, 24 Drawing Sheets

Poly(amic acid)

Polyimide

BRIGHTNESS ENHANCEMENT FILM FOR LIQUID CRYSTAL DISPLAY AND MANUFACTURING METHOD THEREOF

CROSS REFERENCE TO RELATED APPLICATION

This application claims priority to and the benefit of Korean Patent Applications Nos. 10-2004-0028961, filed on Apr. 27, 2004; 10-2004-0028962, filed on Apr. 27, 2004; 10-2004-0028963, filed on Apr. 27, 2004; 10-2004-0030049, filed on Apr. 29, 2004; and, 10-2004-0031734, filed on May 6, 2004, which are hereby incorporated by reference for all purposes as if fully set forth herein.

BACKGROUND OF THE INVENTION

1. Field of the Invention

The present disclosure relates to brightness enhancement films for a liquid crystal display and manufacturing method of the same.

2. Description of Related Art

A liquid crystal display (LCD) is a popular flat panel display. An LCD includes two panels provided with field-generating electrodes, and a liquid crystal (LC) layer interposed between them. The LCD displays images by applying voltages to the field-generating electrodes to generate an electric field in the LC layer. The electric field rearranges orientations of LC molecules in the LC layer to adjust polarization of an incident light.

A liquid crystal display includes a back light unit, an optical film unit for enhancing uniformity of light luminance, and a display unit displaying images with using the uniform light.

The optical film unit includes diffusion films, prism films, and brightness enhancement films.

The brightness enhancement film includes many, e.g., hundreds thin layers. Therefore, the brightness enhancement film is thick, e.g., having a thickness of 140 to 440 μm, and the manufacturing process of the brightness enhancement film is complex.

The films of the optical film unit are respectively manufactured and disposed to have predetermined gaps between them.

The films of the optical film unit have expansion rates corresponding to temperature, and/or humidity. Thus, as the LCD size increases, the expansion discrepancies also increase, which induces an uneven film surface having waves and/or wrinkles. Uneven optical film surfaces degrade display quality.

SUMMARY OF THE INVENTION

The present invention provides a brightness enhancement film for liquid crystal display without waviness and an improved method of manufacturing a brightness enhancement film.

According to an embodiment of the invention, there is provided a method of manufacturing a brightness enhancement film for a liquid crystal display including providing a solution of high molecular weight resin on a high molecular weight film, uniformly distributing the solution of high molecular weight resin on the high molecular weight film, and drying the solution of high molecular weight resin to form a high molecular weight resin layer, wherein the high molecular weight resin layer has a hexagonal lattice structure.

According to an embodiment of the invention, there is provided a brightness enhancement film for a liquid crystal display including a high molecular weight film, and a high molecular weight resin layer formed on the high molecular weight film, wherein the high molecular weight resin layer has a hexagonal lattice structure.

According to an embodiment of the invention, there is provided a method of manufacturing a liquid crystal display including providing a first UV cross-linker on a diffusion film, uniformly distributing the first UV cross-linker on the diffusion film, disposing a brightness enhancement film on the first UV cross-linker, providing a second UV cross-linker on the brightness enhancement film, uniformly distributing the second UV cross-linker on the brightness enhancement film, disposing a prism film on the second UV cross-linker, and illuminating a UV ray at the first and second UV cross-linkers, wherein the brightness enhancement film has a high molecular weight film and a high molecular weight resin layer formed on the high molecular weight film, the high molecular weight film having a hexagonal lattice structure.

According to an embodiment of the invention, there is provided a liquid crystal display including a display unit displaying images, a back light unit providing light to the display unit, an optical film unit provided between the display unit, the optical film unit including a diffusion film, a prism film, and a brightness enhancement film, wherein the brightness enhancement film has a high molecular weight film and a high molecular weight resin layer formed on the high molecular weight film, the high molecular weight resin layer having a hexagonal lattice structure.

According to an embodiment of the invention, there is provided a method of manufacturing a brightness enhancement film for a liquid crystal display, including providing a plurality of photonic colloidal particles of a photonic colloid on a high molecular weight film, and forming a photonic colloidal layer by fixing the photonic colloidal particles, wherein the deposited photonic colloidal particles form a predetermined lattice structure.

According to an embodiment of the invention, there is provided a brightness enhancement film for a liquid crystal display, including a high molecular weight film, and a photonic colloidal layer formed on the high molecular weight film, wherein photonic colloidal particles of the photonic colloidal layer form a predetermined lattice structure.

According to an embodiment of the invention, there is provided a method of manufacturing a liquid crystal display including providing a first UV cross-linker on a diffusion film, uniformly distributing the first UV cross-linker on the diffusion film, disposing a brightness enhancement film on the first UV cross-linker, providing a second UV cross-linker on the brightness enhancement film, uniformly distributing the second UV cross-linker on the brightness enhancement film, providing a prism film on the second UV cross-linker, and illuminating a UV ray at the first and second UV cross-linkers, wherein the brightness enhancement film has a high molecular weight film and a photonic colloidal layer formed on the high molecular weight film, and wherein photonic colloidal particles of the photonic colloidal layer form a predetermined lattice structure.

According to an embodiment of the invention, there is provided a liquid crystal display, including a display unit displaying images, a back light unit providing light to the display unit, and an optical film unit provided between the display unit and the back light unit, the optical film unit having a diffusion film, a prism film, and a brightness enhancement film, wherein the brightness enhancement film has a high molecular weight film and a photonic colloidal layer formed on the high molecular weight film, and wherein photonic colloidal particles of the photonic colloidal layer form a predetermined lattice structure.

According to an embodiment of the invention, there is provided a method of manufacturing a brightness enhancement film for a liquid crystal display including providing a high molecular solution having metal ions on a substrate, uniformly distributing the high molecular solution on the substrate, and drying the high molecular solution to form a high molecular weight film such that the metal ions form a predetermined lattice structure.

According to an embodiment of the invention, there is provided a method of manufacturing a brightness enhancement film for a liquid crystal display, including melting a high molecular weight resin and metal particles, cooling the melted high molecular weight resin and the metal particles using a cooling roll and forming a high molecular weight film, wherein the metal particles distributed in the high molecular weight film form a predetermined lattice structure.

According to an embodiment of the invention, there is provided a brightness enhancement film for a liquid crystal display including a high molecular weight film structure including a plurality of metal particles forming a predetermined lattice or a plurality of metal ion particles.

According to an embodiment of the invention, there is provided a method of manufacturing a liquid crystal display, including providing a first UV cross-linker on a diffusion film, uniformly distributing the first UV cross-linker on the diffusion film, providing a brightness enhancement film on the first UV cross-linker, providing a second UV cross-linker on the brightness enhancement film, uniformly distributing the second UV cross-linker on the brightness enhancement film, providing a prism film on the second UV cross-linker, and illuminating a UV ray at the first and second UV cross-linkers, wherein the brightness enhancement film has a high molecular weight film structure including a plurality of metal particles forming a predetermined lattice or a plurality of metal ion particles.

According to an embodiment of the invention, there is provided a liquid crystal display including a display unit displaying images, a back light unit providing light to the display unit, and an optical film unit provided between the display unit and the back light unit and including a diffusion film, a prism film, and a brightness enhancement film, wherein the brightness enhancement film has a structure of a high molecular weight film including a plurality of metal particles forming a predetermined lattice or a plurality of metal ion particles.

According to an embodiment of the invention, there is provided a method of manufacturing a brightness enhancement film for a liquid crystal display, including coating a liquid crystal material having a plurality of encapsulated liquid crystal molecules on a high molecular weight film, and forming a liquid crystal layer by positioning the encapsulated liquid crystal molecules in a predetermined direction, wherein the encapsulated liquid crystal molecules have a micelle structure.

According to an embodiment of the invention, there is provided a brightness enhancement film for a liquid crystal display including a high molecular weight film, and a liquid crystal layer formed on the high molecular weight film, wherein the liquid crystal layer includes a plurality of encapsulated liquid crystal molecules having a micelle structure and positioned in a predetermined direction.

According to an embodiment of the invention, there is provided a method of manufacturing a liquid crystal display including providing a first UV cross-linker on a diffusion film, uniformly distributing the first UV cross-linker on the diffusion film, providing a brightness enhancement film on the first UV cross-linker, providing a second UV cross-linker on the brightness enhancement film, uniformly distributing the second UV cross-linker on the brightness enhancement film, providing a prism film on the second UV cross-linker, and illuminating a UV ray at the first and second UV cross-linkers, wherein the brightness enhancement film has a high molecular weight film and a liquid crystal layer including a plurality of encapsulated liquid crystal molecules having a micelle structure and positioned in a predetermined direction.

According to an embodiment of the invention, there is provided a liquid crystal display including a display unit displaying images, a back light unit providing light to the display unit, an optical film unit provided between the display unit and the back light unit, the optical film unit including a diffusion film, a prism film, and a brightness enhancement film, wherein the brightness enhancement film has a high molecular weight film and a liquid crystal layer formed on the high molecular weight film, and wherein the liquid crystal layer including a plurality of encapsulated liquid crystal molecules having a micelle structure and positioned in a predetermined direction.

According to an embodiment of the invention, there is provided a method of manufacturing a brightness enhancement film for a liquid crystal display, including melting a high molecular weight resin and organic particles having a core shell structure, cooling the melted high molecular weight resin and the organic particles with a cooling roll to form a high molecular weight film, and drawing the high molecular weight film in a direction with heating.

According to an embodiment of the invention, there is provided a brightness enhancement film for a liquid crystal display including a high molecular weight film and organic particles having a core shell structure and distributed in the high molecular weight film.

According to an embodiment of the invention, there is provided a method of manufacturing a liquid crystal display, including providing a first UV cross-linker on a diffusion film, uniformly distributing the first UV cross-linker on the diffusion film, providing a brightness enhancement film on the first UV cross-linker, providing a second UV cross-linker on the brightness enhancement film, uniformly distributing the second UV cross-linker on the brightness enhancement film, providing a prism film on the second UV cross-linker, and illuminating a UV ray at the first and second UV cross-linkers, wherein the brightness enhancement film includes a high molecular weight film and organic particles includes a core shell structure and distributed in the high molecular weight film.

According to an embodiment of the invention, there is provided a display unit displaying images, a back light unit providing light to the display unit, and an optical film unit provided between the display unit and the back light unit, the optical film unit including a diffusion film, a prism film, and a brightness enhancement film, wherein the brightness enhancement film includes a high molecular weight film and organic particles including a core shell structure and distributed in the high molecular weight film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Figure 1:
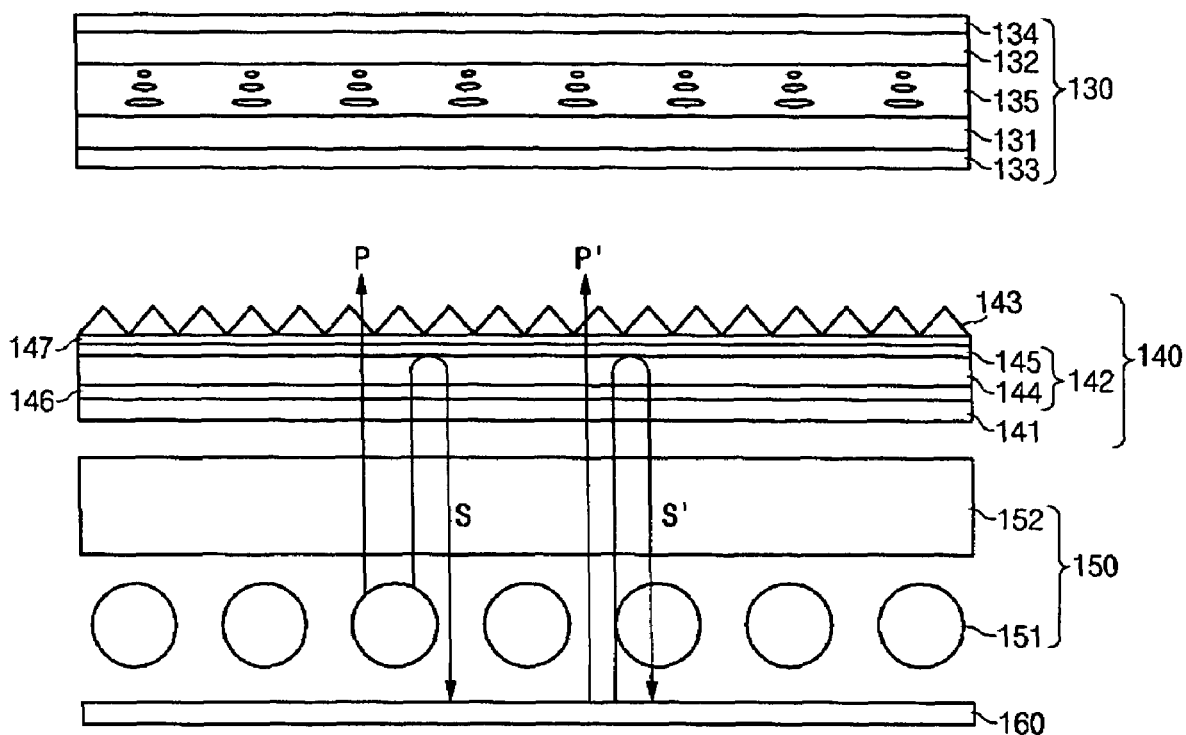
FIG. 1 is a sectional view of an LCD having a brightness enhancement film according to an embodiment of the invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. However, when an element is referred to as being "directly on" another element, there are no intervening elements present.

A brightness enhancement film for an LCD and manufacturing methods thereof according to embodiments of the invention will be described with reference to the accompanying drawings.

FIG. 1 is a sectional view of an LCD having a brightness enhancement film according to an embodiment of the invention. As shown in FIG. 1, an LCD 100 having a brightness enhancement film includes a display unit 130 displaying images, a back light unit 150 provided under the display unit 130 and providing light to the display unit 130, and an optical film unit 140 provided between the display unit 130 and the back light unit 150 that makes light luminance more uniform.

The display unit 130 includes a thin film transistor (TFT) array panel 131, a color filter array panel 132, and a liquid crystal layer 135. The display unit 130 further includes upper and lower polarizing films 133 and 134 respectively disposed on a lower side of the TFT array panel 131 and an upper side of the color filter array panel 132.

The TFT array panel 131 has a plurality of pixel electrodes (not illustrated) arrayed in a matrix form, a plurality of TFTs switching applying of image signals to the pixel electrodes, and a plurality of gate lines and data lines (not illustrated) connected with the TFTs.

The color filter array panel 132 has a common electrode for generating an electric field, along with the pixel electrode and color filters for expressing colors.

When a voltage difference is applied between the pixel electrode and the common electrode, a electric field forms to rearrange liquid crystal molecules between the two electrodes.

The backlight unit 150 has a plurality of lamps 151 and a light guiding panel 152 for guiding the light from the lamps 151 to the display unit 130. For example, FIG. 1 shows lamps 151 disposed directly under the display unit 130 and the light guiding panel 152 (direct type back light). The light guiding panel 152 is disposed under the display unit 130 and has a size corresponding or proportional with the display unit 130. In FIG. 1, for example, the light guiding panel 152 has a uniform width. However, the light guiding panel may have a wedge shape, or other non-uniform shape.

The optical film unit 140 for enhancing uniformity of light luminance is provided on the light guiding panel 152. A reflection film 160 that increases light by reflecting light to the light guiding panel 152 is provided under the light guiding panel 152.

The optical film unit 140 includes a plurality of optical films. That is, the optical film unit 140 includes a diffusion film 141 diffusing light from the back light unit 150 to make the light illumination more uniform, a brightness enhancement film 142 allowing transmission of P waves and reflecting S waves for recycling, and a prism film 143 for condensing light.

The brightness enhancement film 142 is provided on the diffusion film 141 and the prism film 143 is provided on the brightness enhancement film 142.

The diffusion film 141 and the brightness enhancement film 142 are connected with each other by a first ultra violet (UV) cross-linker 146. For example, the diffusion film 141 and the brightness enhancement film 142 may be adhered together. The brightness enhancement film 142 and the prism film 143 are similarly connected with each other by a second UV cross-linker 147. Therefore, the optical film unit 140 is formed or becomes one body.

The waviness or unevenness of the optical film unit 140 caused by the films 141, 142, and 143 having different expansion rates with respect to environmental conditions, such as temperature and humidity, is prevented or substantially reduced since the diffusion film 14, the brightness enhancement film 142, and the prism film 143 are tightly adhered or connected with each other.

The brightness enhancement film 142 includes a high molecular weight film 144 and a high molecular weight resin layer 145 formed on the high molecular weight film 144 and having hexagonal lattice.

The high molecular weight film 144 may be made of a polycarbonate, a poly ethylene terephthalate, or the like.

The high molecular weight resin layer 145 may be made of one of a polysulfone, a polymethylmethacrylate, a polystyrene, a polyvinylchloride, a polyvinylalcohol, a polynorbonene, a polymer formed by copolymerization, or the above polymers, or a derivative thereof.

According to an embodiment of the invention, the hexagonal lattice 45 structure of the high molecular weight resin layer 145 has a size or diameter of approximately 10 nm to 800 nm.

The high molecular weight resin layer 145 having the hexagonal lattice 45 structure (shown in FIG. 4) displays reflection-polarization properties. For example, the hexagonal lattice 45 structure allows for a transmission of P waves and reflects S waves for recycling.

Light emitted from the back light unit 150 includes P waves and S waves. Referring to F16, only the P waves are provided to the display unit 130 through the brightness enhancement film 142 and the S waves are reflected by the brightness enhancement film 142.

The brightness enhancement film 142 allows transmission of P waves of light having approximately a 250 to 800 nm wavelength and reflects S waves of light having approximately a 250 to 800 nmwavelength for recycling purposes.

The reflected S waves is rebounded or redirected to the reflection film 160 and is partially turned into P waves. The P waves of the rebounded light transmit the brightness enhancement film 142 and the rebounded S waves, which is reflected again by the brightness enhancement film 142. The above-described partial reflection and transmission is repeated to increase the amount of P waves provided to the display unit 130. As more P waves are provided to the display unit 130, the brightness of the LCD is enhanced.

When the brightness enhancement film 142 is elongated in a particular direction with heating, the reflection-polarization properties of the brightness enhancement film 142 are enhanced or improved. In other words, since the hexagonal lattice 45 is arranged along the elongated direction, different refraction rates between the elongated direction and direction perpendicular to the elongated direction are produced that enhance or improve the reflection-polarization properties.

The brightness enhancement film 142 is preferably elongated by approximately 1.1 to 8 times through the drawing with heating.

A conventional brightness enhancement film includes hundreds of thin layers. Therefore, the conventional brightness enhancement film is typically very thick, i.e., a thickness of approximately 140 to 440 µm, which makes the manufacturing process of the brightness enhancement film complex. However, since the brightness enhancement film 142 according to the present invention includes single layer or several layers, the width of the brightness enhancement film 142 is thinner than conventional enhancement film, thereby simplifying the manufacturing process.

A method of manufacturing of the brightness enhancement film 142 is described hereinbelow with reference to FIGS. 2 through 5.

Figure 2:
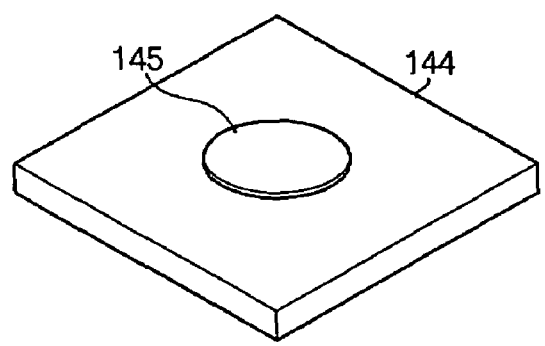
FIGS. 2 through 5 each illustrate a process manufacturing a brightness enhancement film according to an embodiment of the invention.

Referring to an embodiment of the invention shown in FIG. 2, a solution 145 of high molecular weight resin is dropped or provided on a high molecular weight film 144. The high molecular weight film 144 is made of, for example, a polycarbonate, a poly ethylene terephthalate (PET), or the like. The solution 145 of high molecular weight resin is a mixture of a high molecular weight resin and water.

Figure 3A:
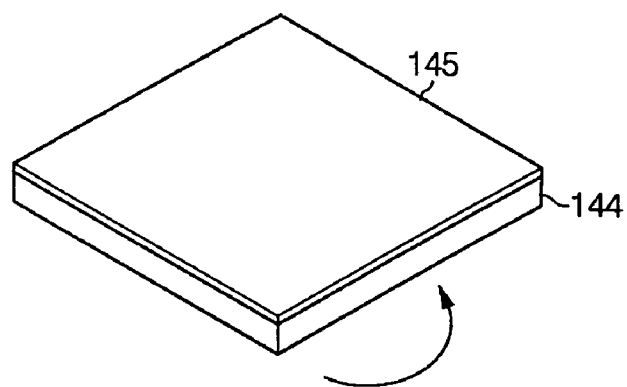
Figure 3B:
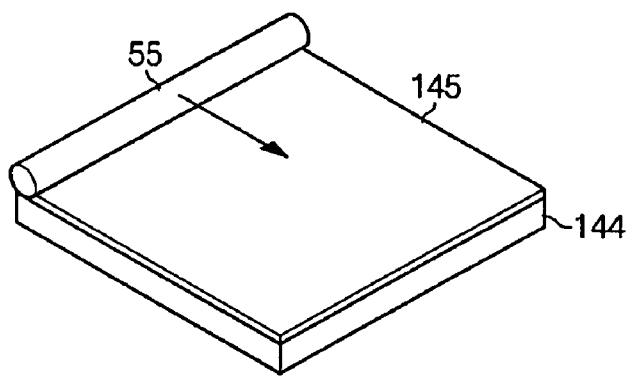

Next, as shown in FIGS. 3A and 3B, the solution 145 of the high molecular weight resin is substantially uniformly or evenly coated on the high molecular weight film 144 by a coating technique, such as spin coating or blading.

As shown in FIG. 3A, when the spin coating technique is used, the high molecular weight film 144 solution is spun and the solution 145 is coated on the high molecular weight film 144 in a uniform thickness.

As shown in FIG. 3B, when the blading technique is used, the solution 145 of the high molecular weight resin is spread on the high modular weight film 144 by a roller 55 device.

Figure 4:
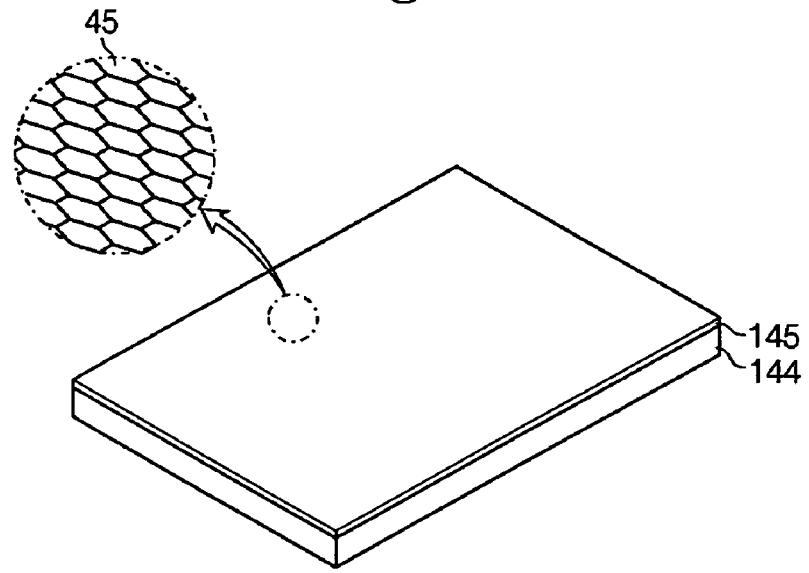

Next, as shown in FIG. 4, the solution 145 of the high molecular weight resin is dried and forms a high molecular weight resin layer 145. The high molecular weight resin is dried under a temperature between approximately 4° Celsius and 100° Celsius. According to an embodiment of the invention, the high molecular weight resin is dried on a hot plate moving a temperature between approximately 40° Celsius and 60° Celsius and forms the high molecular layer 145, which has a hexagonal lattice structure.

The high molecular weight resin layer 145 may be made of a polysulfone, a polymethylmethacrylate, a polystyrene, a polyvinylchloride, a polyvinylalcohol, a polynorbonene, a polymer formed by copolymerization of the above polymers, or a derivative thereof.

Figure 5:
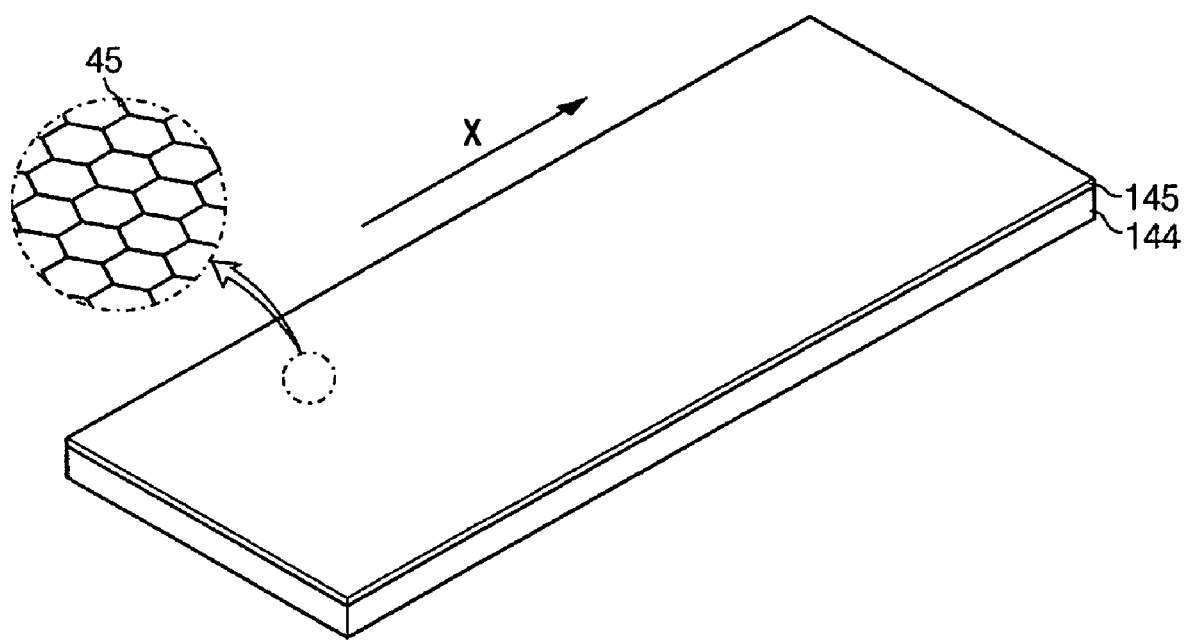

Referring to FIG. 5, the high molecular weight film 144 and the high molecular weight resin layer 145 are drawn to a predetermined direction with heating, for example X direction.

The drawing of the high molecular weight film 144 may be performed at a temperature between the glass transition temperature of the high molecular weight film 144 and a temperature that is approximately 100° Celsius higher than the glass transition temperature. The brightness enhancement film 142 may be extended by approximately 1.1 to 8 times through the drawing with heating.

According to the above-described embodiment of the invention, the glass transition temperature of the high molecular weight film 144 refers to a temperature where Brownian motion of particles included in the high molecular weight film 144 is most active. When the temperature is above the glass transition temperature, the high molecular weight film 144 may be easily elongated or extended. For an example, the glass transition temperature of a poly ethylene terephthlate (PET) film is approximately 75° Celsius.

As described above, and shown in FIG. 5, the high molecular weight resin layer 145 is elongated in X direction with heating to enhance, or improve reflection-polarizing properties. In other words, since hexagonal lattice 45 are positioned along the elongated direction, different refraction rates between the elongated direction and a direction perpendicular to the elongated direction is produced to enhance or improve the reflection-polarization properties.

Enhancing the reflection-polarization properties allow for P waves to be transmitted through the high molecular weight resin 145 and the S waves to be reflected by the high molecular weight resin 145 and recycled. As the amount of P waves provided to the display unit 130 through the high molecular weight resin layer 145 increases, the brightness of the LCD also increases.

A method of manufacturing an LCD having the brightness enhancement film 142 is described hereinbelow with reference to FIGS. 6 to 9.

Figure 6:
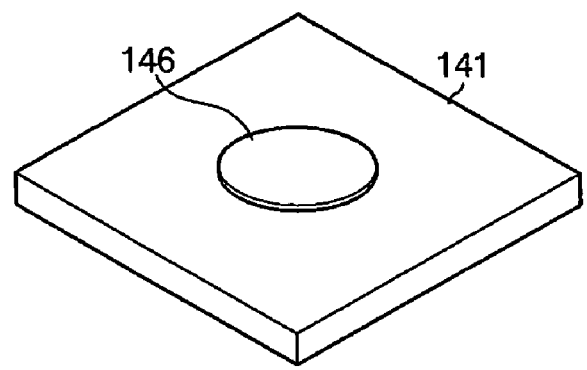
FIGS. 6 through 9 each illustrate a process of manufacturing an LCD having a brightness enhancement film according to an embodiment of the invention.

Referring to an embodiment shown in FIG. 6, a first UV cross-linker 146 is dropped or provided on a diffusion film 141.

Figure 7A:
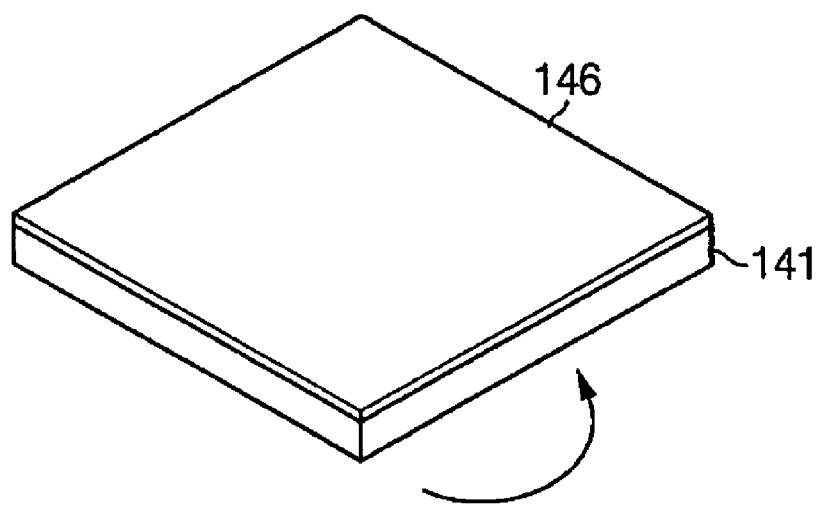
Figure 7B:
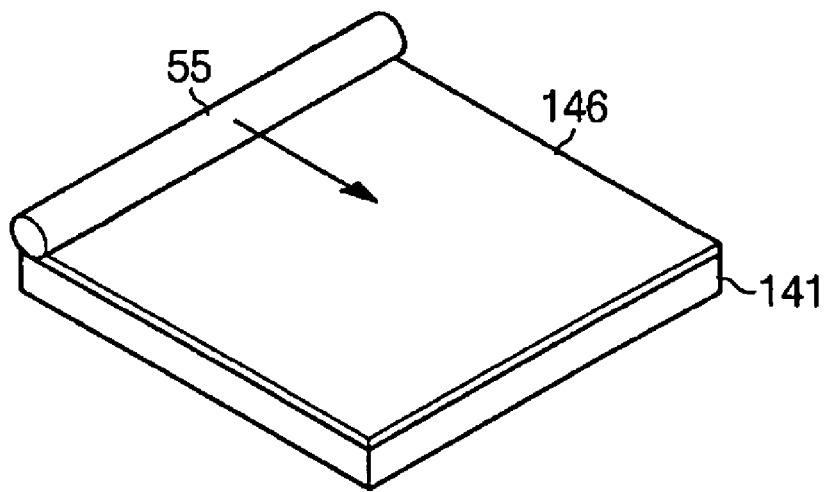

Referring to FIGS. 7A and 7B, the first UV cross-linker 146 is uniformly coated on the diffusion film 141. The first UV cross-linker 146 may be uniformly coated on the diffusion film 141 using many different techniques.

As shown in FIG. 7A, for example, the first UV cross-linker 146 may be uniformly coated on the diffusion film 141 by spin coating. As shown in FIG. 7B, for example, the first UV cross-linker 146 may be uniformly coated on the diffusion film 141 by blading with a roller 55.

Figure 8A:
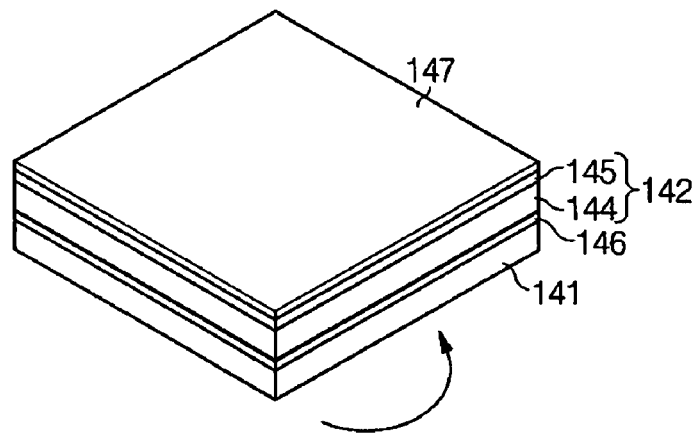
Figure 8B:
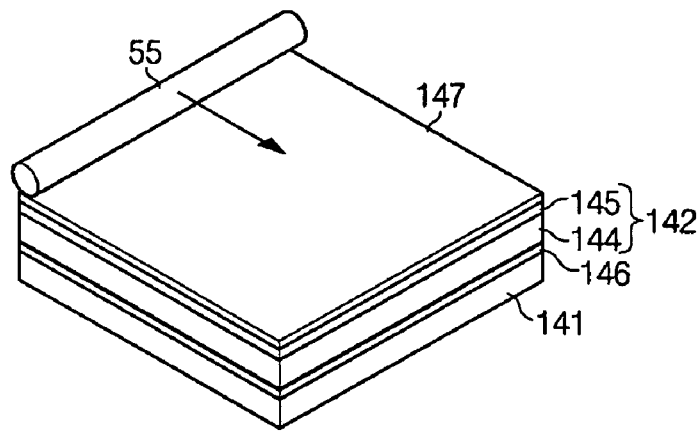

Referring to FIGS. 8A and 8B, the brightness enhancement film 142 is disposed or provided on the first UV cross-linker 146. In an non-limiting example shown in FIGS. 8A and 8B, the brightness enhancement film 142 is made of a high molecular weight film 144 and a high molecular weight resin layer 145 that is formed or provided on the high molecular weight film 144 and has a hexagonal lattice 45 structure.

The high molecular weight resin layer 145 having the hexagonal lattice 45 structure displays has reflection-polarization properties. For example, the high molecular weight resin layer 145 allows for the P waves to be transmitted into the high molecular weight resin layer 145 and the S waves to be reflected by the high molecular weight resin layer 145 for recycling. The reflected S waves are then rebounded by the reflection film 160 and partially turned into P waves. The P waves of the rebounded light transmit the brightness enhancement film 142 and S waves of the rebounded light are reflected again by the brightness enhancement film 142. The partial reflection and transmission of light is repeated and increases the amount of P waves provided to the display unit 130, which increases or enhances brightness of the LCD.

A second UV cross-linker 147 is dropped, or provided on a top surface of the brightness enhancement film 142. The second UV cross-linker is uniformly distributed on or across of the brightness enhancement film. The second UV cross-linker may be uniformly distributed using various techniques.

Referring to FIG. 8A, for example, the second UV cross-linker 147 may be uniformly coated on the diffusion film 141 by a spin coating technique. Referring to FIG. 8B, the second UV cross-linker 147 may be uniformly coated on the diffusion film 141 by a blading technique using a roller 55. Further, it is understood that the layers 141, 146, and the brightness enhancement layer are held or connected together during the spinning technique and the blading technique via a separate process of illumination a UV ray.

Figure 9:
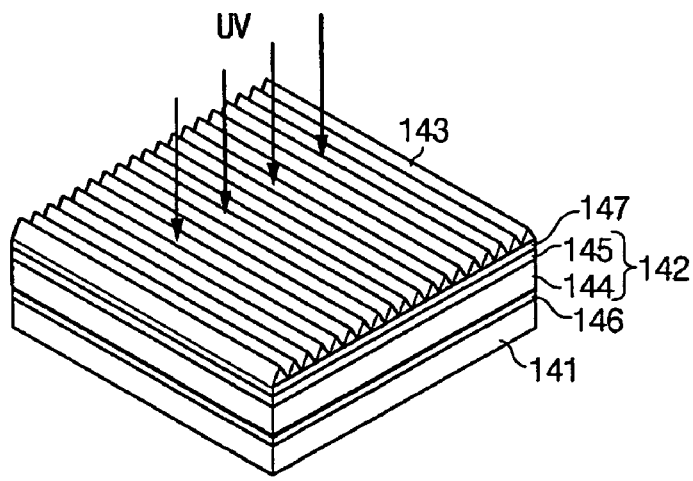

Referring to FIG. 9, a prism film 143 is disposed or provides on a top surface of the second UV cross-linker 147. The first and second UV cross-linkers 146 and 147 are illuminated by UV rays to bond or connect the diffusion film 141 and the brightness enhancement film 142 with the first UV cross-linker 146 and to bond or connect the brightness enhancement film 142 and the prism film 143 with the second UV cross-linker 147.

The waviness or unevenness of the optical film unit 140 caused by the films 141, 142, and 143 having different expansion rates with respect to environmental conditions, such as temperature and humidity, is prevented or substantially reduced because the diffusion film 14, the brightness enhancement film 142, and the prism film 143 are tightly adhered or connected with each other.

In the above-described embodiment of the invention, the first and second UV cross-linker 146 and 147 are simultaneously illuminated by UV ray to bond or connect together the diffusion film 141, the brightness enhancement film 142, and the prism film 143. However, it is understood that the second UV cross-linker 147 may be coated after the first UV cross-linker 146 is illuminated by UV ray. Thus, the prism film 143 is provided on the second UV cross-linker 147 and the second UV cross-linker 147 is subsequently illuminated by UV rays to bond or connect together the brightness enhancement film 142 and the prism film 143.

In a non-limiting embodiment of the present invention, a first UV cross-linker 146 is provided on a diffusion film 142 and uniformly distributed. A brightness enhancement film 142 is provided on the first UV cross-linker 146, and a second UV cross-linker 147 is provided on the brightness enhancement film 142, and uniformly distributed. A prism film 143 is provided on a second UV cross-linker 147; and UV rays are illustrated at the first and second UV cross-linkers 146 and 147 either simultaneously or separately. However, according to another embodiment of the invention, an optical film unit having one body structure may be manufactured by a roll to roll process.

Figure 10:
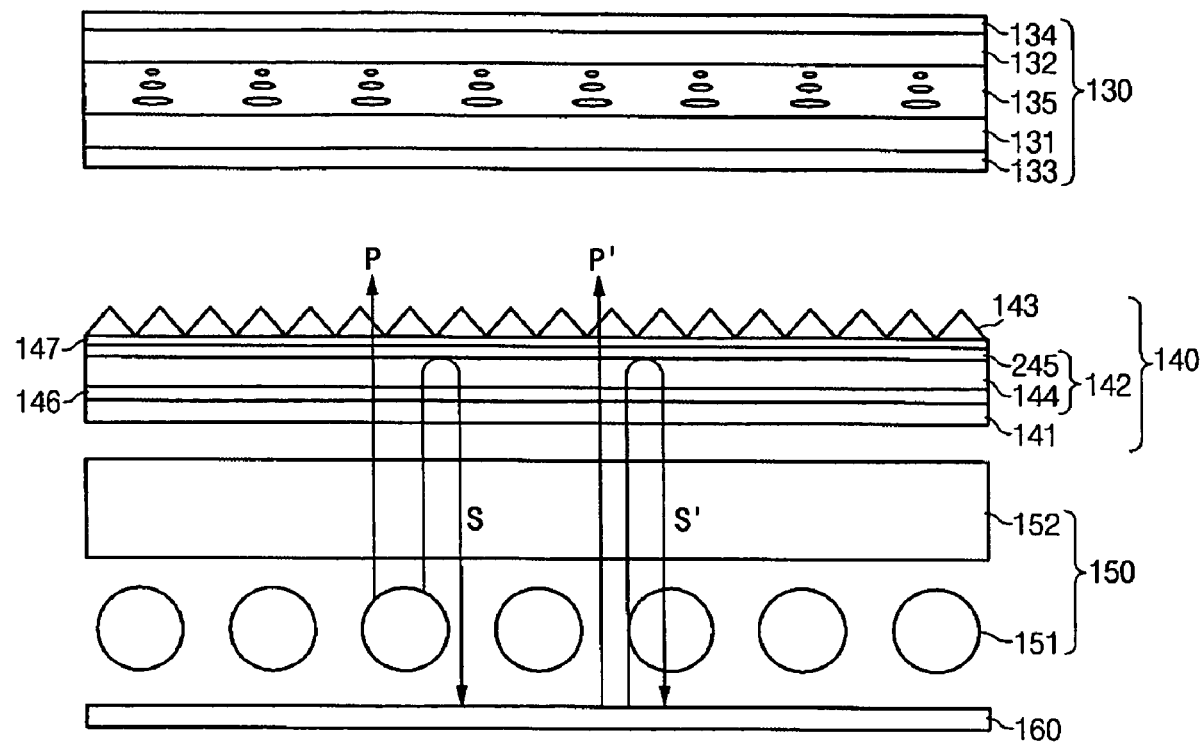
FIG. 10 is sectional view of an LCD having a brightness enhancement film according to another embodiment of the invention.

FIG. 10 is sectional view of an LCD having a brightness enhancement film according to another embodiment of the invention.

Referring to the embodiment shown in FIG. 10, an LCD 100 having a brightness enhancement film includes a display unit 130 displaying images, a back light unit 150 provided under or below the display unit 130 and providing light to the display unit 130, and an optical film unit 140 provided between the display unit 130 and the back light unit 150 to improve or increase light luminance uniformity.

The display unit 130 includes a TFT array panel 131, a color filter array panel 132, and a liquid crystal layer 135. The display unit 130 further includes upper and lower polarizing films 133 and 134 provided at a lower side of the TFT array panel 131 and an upper side of the color filter array panel 132, respectively.

The backlight unit 150 has a plurality of lamps 151 and a light guiding panel 152 to guide the light from the lamps 151 to the display unit 130. In a non-limiting embodiment, FIG. 10 shows lamps 151 located directly under the display unit 130 and the light guiding panel 152 (direct type back light). The light guiding panel 152 is located under the display unit 130 and has a size corresponding with the display unit 130. In FIG. 10, the light guiding panel 152, is shown to have a uniform width. However, it is understood that the light guiding panel may have a wedge shape, or other non-uniform shape.

The optical film unit 140 for enhancing or improving the uniformity of light luminance is provided on the light guiding panel 152. A reflection film 160 that reflects light back to the light guiding panel 152 to increase light more efficiently is provided under the light panel guiding panel 152 to increase light using efficiency is disposed under the light guiding panel 152.

The optical film unit 140 includes a plurality of optical films. For example, the optical film unit 140 includes a diffusion film 141 diffusing light from the back light unit 150 to enhance/improve uniformity of light illumination, a brightness enhancement film 142 allowing for the transmission of P waves and the reflection of S waves for recycling, and a prism film 143 for condensing light.

The brightness enhancement film 142 is provided on the diffusion film 141 and the prism film 143 is provided on the brightness enhancement film 142.

The diffusion film 141 and the brightness enhancement film 142 are adhered or connected with each other by a first UV cross-linker 146. The brightness enhancement film 142 and the prism film 143 are adhered or connected with each other by a second UV cross-linker 147. Therefore, the optical film unit 140 may be formed as one body or structure.

The waviness or unevenness of the optical film unit 140 caused by the films 141, 142, and 143 having different expansion rates with respect to environmental conditions, such as temperature and humidity, is prevented or substantially reduced because the diffusion film 14, the brightness enhancement film 142, and the prism film 143 are tightly adhered or connected with each other.

The brightness enhancement film 142 includes a high molecular weight film 144 and a photonic colloidal layer 245 formed on the high molecular weight film 144. As the number of brightness enhancement films 142 included in the optical film unit increases, the uniformity of the light illumination improves.

For example, the high molecular weight film 144 may be made of a polycarbonate, a poly ethylene terephthalate, a polyimide, a polyamide, a polyether, a polysulfone, a polypropylene, a polymethylmethacrylate, a polypropylene, a acetylcellulose, a polymer formed by copolymerization of the above polymers, or a derivative thereof.

Figure 11A:
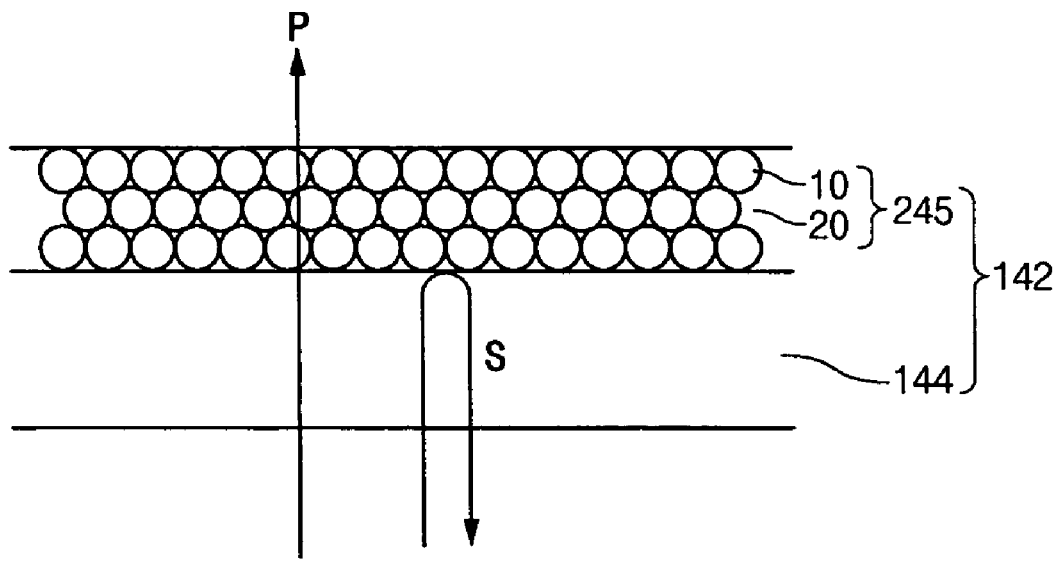
FIG. 11A illustrates photonic colloidal particles deposited on a high molecular weight film and having a lattice structure.
Figure 11B:
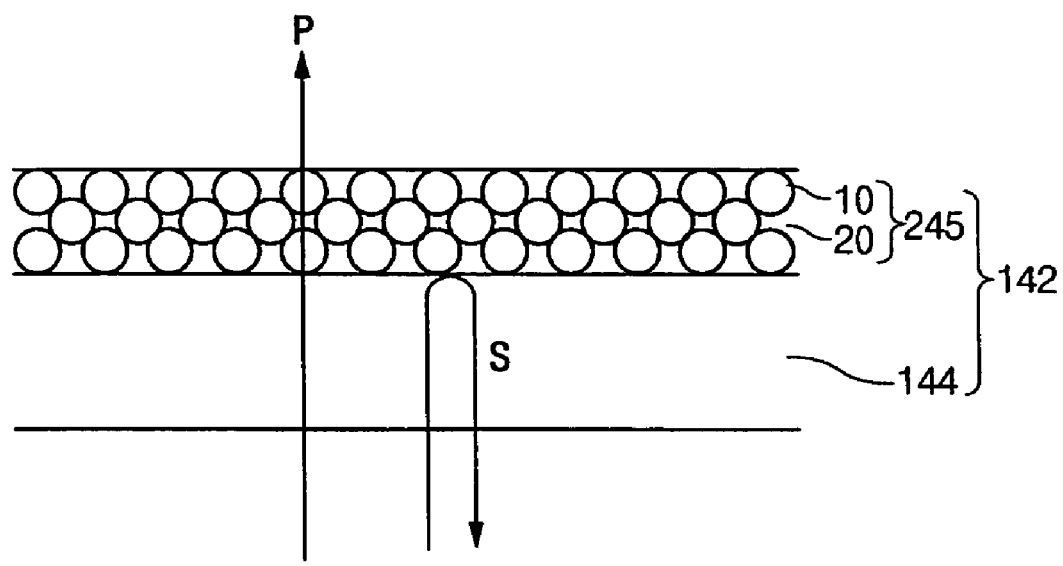
FIG. 11B illustrates photonic colloidal particles deposited on a high molecular weight film and having another lattice structure.

Referring to the embodiments shown in FIGS. 11A and 11B, a photonic colloidal layer 245 includes a plurality of photonic colloidal particles 10 and a high molecular weight resin 20. The photonic colloidal particles 10 may be formed having any of several lattice structures.

FIG. 11A, for example, illustrates photonic colloidal particles 10 provided on a high molecular weight film having a (111) lattice structure. FIG. 11B, for example, illustrates photonic colloidal particles 10 provided on a high molecular weight film having a (100) lattice structure.

As shown in FIGS. 11A and 11B, the photonic colloidal particles 10 form a predetermined lattice structure, such as (111) and (100). The photonic colloidal particles 10 may be several nanometers to several hundreds nanometers.

The high molecular weight resin 20 is formed by hardening a high molecular solution having the same substance and arranging/positioning photonic colloidal particles 10. The photonic colloidal layer 245 having the photonic colloidal particles 10 provided in a specific lattice structure has reflection-polarization properties that allow for P waves of light to be transmitted and S waves to be reflected for recycling.

As shown in FIGS. 10, 11A, and 11B, light emitted from the back light unit 150 includes both P waves and S waves. According to the invention, P waves are provided to the display unit 130 through the brightness enhancement film 142 and S waves are reflected by the brightness enhancement film 142.

According to an embodiment of the invention, the brightness enhancement film 142 transmits P waves of light having a wavelength of approximately 250 to 800 nm and reflects S waves of light having a wavelength 250 to 800 nm for recycling.

The reflected S waves are rebounded or reflected back to the brightness enhancement film 142 by the reflection film 160 and partially turned into P waves. The P waves of the rebounded light are transmitted through the brightness enhancement film 142 and S waves of the rebounded light are reflected again by the brightness enhancement film 142. The partial reflection and transmission is repeated to increase the amount of P waves provided to the display unit 130, which increases and enhances a brightness of the LCD.

The reflection-polarization properties of the optical film unit 140 are enhanced or improved by having multiple layers of brightness enhancement film 142.

Conventional brightness enhancement film includes hundreds of thin layers. Therefore, the conventional brightness enhancement film is typically very thick, e.g., having a thickness of 140 to 440 µm, and the manufacturing process is complex. However, since the brightness enhancement film 142 according to the present invention includes single layer or several layers, the brightness enhancement film 142 is thin and the manufacturing process is simple, relative to the conventional brightness enhanced films.

A method of manufacturing the brightness enhancement film 142 is described hereinbelow with reference to FIGS. 12 through 14.

Figure 12:
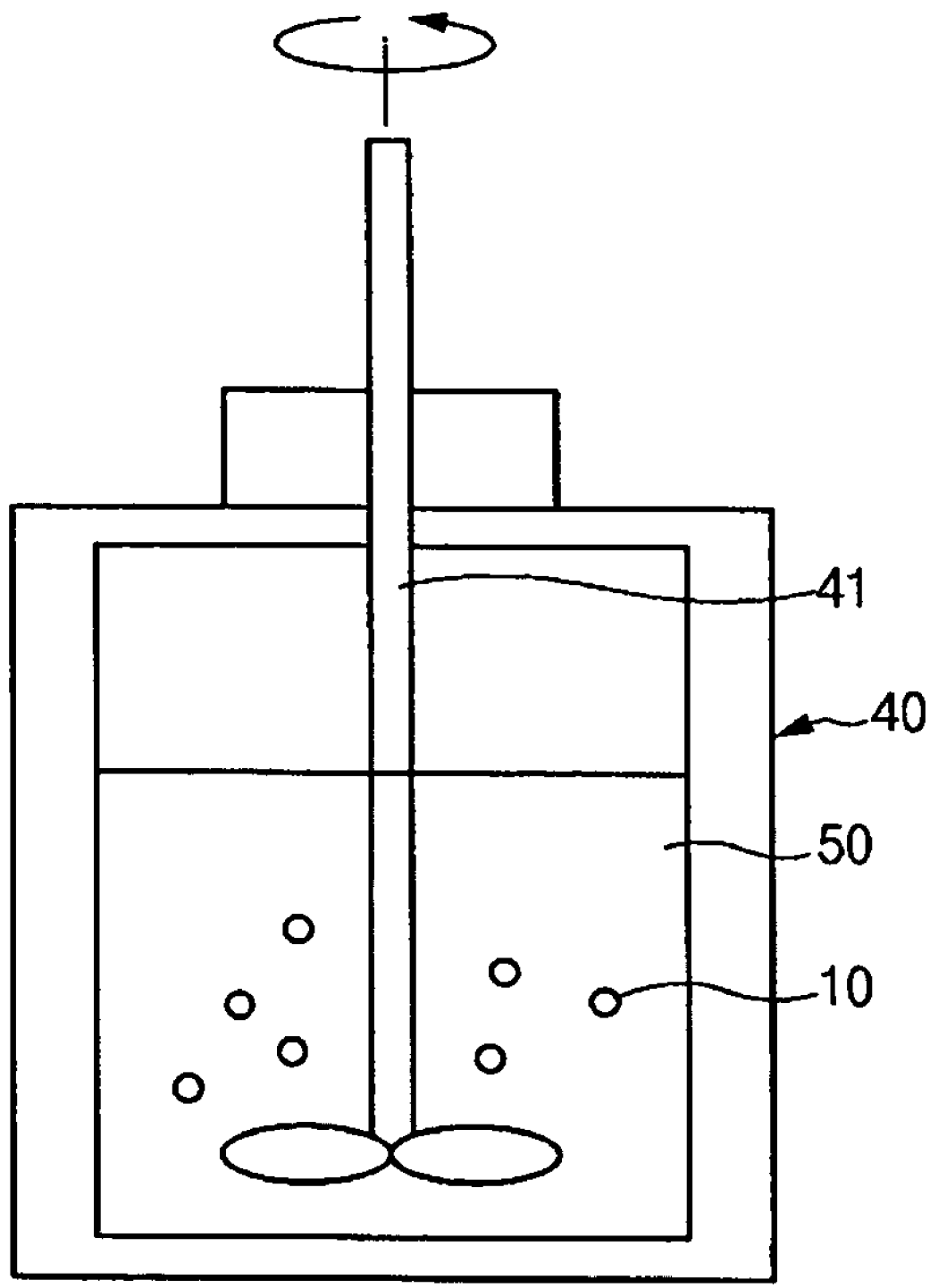
FIG. 12 is a sectional view of a reactor for manufacturing photonic colloid.

Referring to an embodiment of the invention shown in FIG. 12, a photonic colloid is manufactured using a reactor. For example, 450 g of deionized water (DI water), 0.3 g of sodium styrene sulfonate as an emulsifier or surfactant, and 0.25 g of sodium hydrogen carbonate as a neutralizer or a buffer are put in the reactor 40.

The temperature inside the reactor 40 is maintained at about 80° Celsius while an agitator 41 in the reactor 40 is spun at over 350 rpm for approximately 10 minutes to agitate substances in the reactor 40. In other words, for example, two or more substances having different physical and chemical characteristics are homogeneously mixed together by external mechanical energy.

Approximately 50 g of styrene monomers are cast into the reactor 40, after the substances have been agitated.

Approximately one hour later, 0.25 g of potassium persulfate is put in the reactor 40 as an initiator and then polymerization takes place in a nitrogen atmosphere for approximately 18 hours to form a photonic colloid.

The size of the photonic colloid particles 10 may be adjusted by controlling a concentration ratio between the monomer and the emulsifier.

In a non-limiting example, the photonic colloidal particles 10 are several tens nanometers to several hundreds of nanometers in size.

The photonic colloidal particles 10 of the photonic colloid 50 are deposited or provided on a high molecular weight film 144.

Figure 13A:
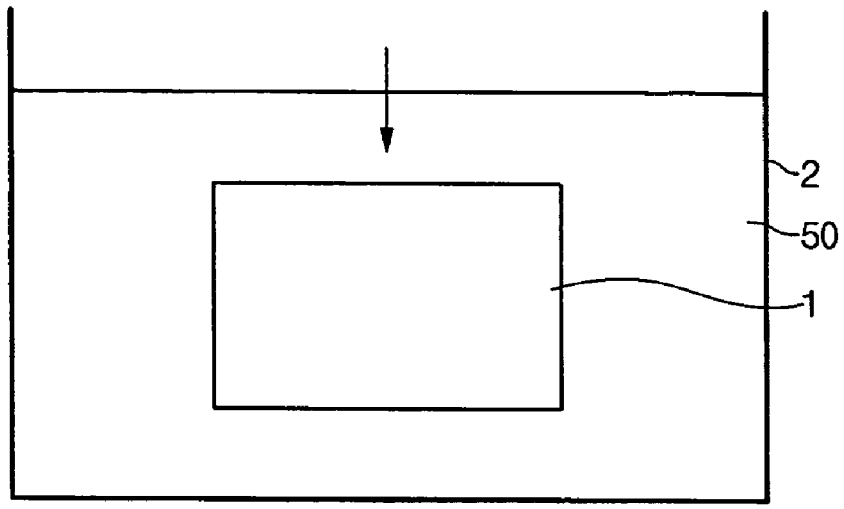
FIGS. 13A through 13D each illustrate a process of manufacturing a brightness enhancement film according to another embodiment of the invention.
Figure 13B:
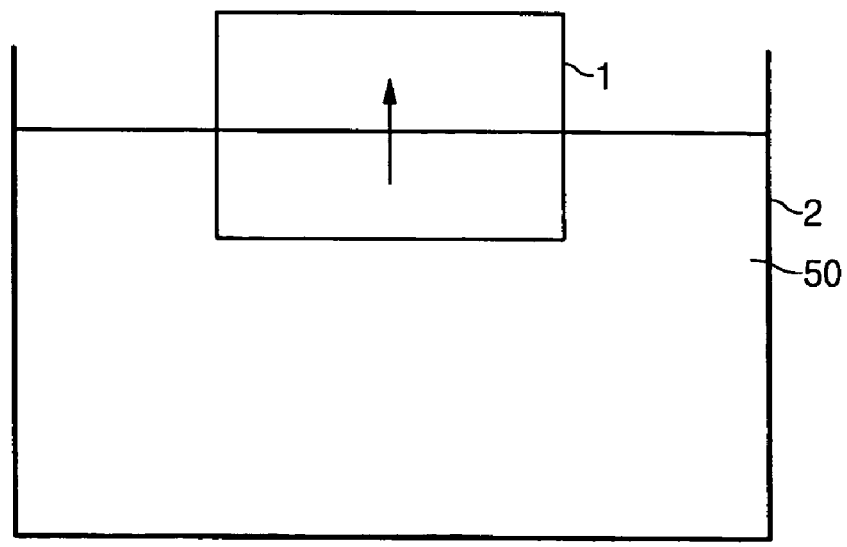

The photonic colloidal particles 10, as shown in FIG. 13A, are deposited or provided on the high molecular weight film 144 by dipping or putting a glass substrate 1 having the high molecular weight film 144 into a vessel 2 having the photonic colloid 50. For example, as shown in FIGS. 13A and 13B, the glass substrate 1 is dipped into the vessel 2 having the photonic colloid 50. In the dipping method, the glass substrate 1 having the high molecular weight film 144 is vertically thrown onto the photonic colloid 50 so that the high molecular weight film 144 contacts the photonic colloid 50.

The high molecular weight film 144 may be made of a polycarbonate, a poly ethylene terephthalate, a polyimide, a polyamide, a polyether, a polysulfone, a polypropylene, a polymethylmethacrylate, a polypropylene, a acetylcellulose, a polymer formed by copolymerization of the above polymers, or a derivative thereof.

Referring to FIG. 13B, the glass substrate 1 having the high molecular weight film 144 is removed from the vessel 2 and dried for several minutes to several tens of hours in a vacuum having a temperature from approximately 4 to 100° Celsius.

Figure 13C:
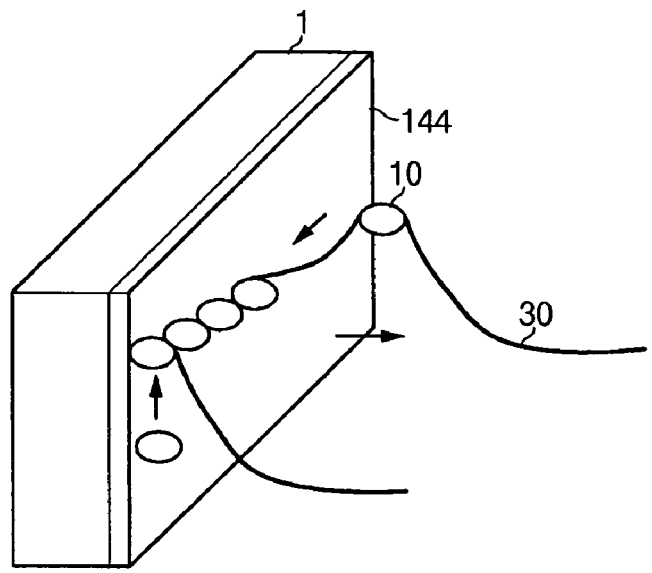

Referring to FIG. 13C, the photonic colloidal particles 10 are deposited or provided on the high molecular weight film 144 along with an evaporated organic solvent 30, such as water or ethanol, which is included in the photonic colloid 50. Similar to the embodiment shown in FIG. 13D, the photonic colloidal particles 10 form a predetermined lattice structure.

Referring to FIGS. 11A and 11B, a high molecular weight resin 20 having the same substance as the high molecular weight film 144 is coated on the high molecular weight film 144 to preserve the photonic colloidal particles 10 deposited on the high molecular weight film 144. Accordingly, the photonic colloidal particles 10 forming a predetermined lattice structure are fixed on, connected to, and/or attached with the high molecular weight film 144.

The first photonic colloidal layer 245 having the high molecular weight resin 20 and the deposited photonic colloidal particles 10 has reflection-polarization properties. For example, the lattice structure formed by the deposited photonic colloidal particles 10 transmits P waves and reflects S waves for recycling.

Light emitted from the back light unit 150 comprises P waves and S waves. As shown in FIGS. 11A and 11B, only the P waves are provided or sent to the display unit 130 through the brightness enhancement film 142 and the S waves are reflected by the brightness enhancement film 142, and recycled.

The reflected S waves rebound off of the reflection film 160 and partially turn into P waves. The P waves of the rebound light transmit or travels through the brightness enhancement film 142 and the S waves of the rebound light are reflected again by the brightness enhancement film 142. The partial reflection and transmission repeats and increases the amount of P waves provided or sent to the display unit 130, which enhances a brightness of the LCD.

According to an embodiment of the invention, the high molecular weight resin 20 is uniformly coated by using a coating technique such as spin coating, blading, or dipping.

Additional high molecular weight films and photonic colloidal layers 246 may be formed on the first photonic colloidal layer 245 to enhance or improve the reflection-polarization properties of the brightness enhancement film 142.

Figure 14:
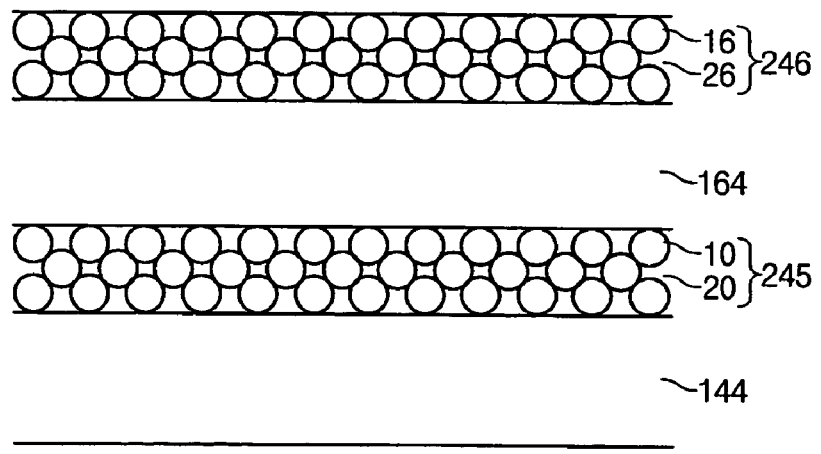
FIG. 14 illustrates double photonic colloidal layers.

FIG. 14 illustrates double photonic colloidal layers. Referring to FIG. 14, another high molecular weight film 164 is provided on or attached with the first photonic colloidal layer 245. A glass substrate having the high molecular weight films 144 and 164 and the first photonic colloidal layer 245 is dipped into a photonic colloid solution.

The glass substrate is removed from the photonic colloid and dried to evaporate organic solvents such as water or ethanol, and to form a second photonic colloidal layer 246 having a predetermined lattice of the photonic colloidal particles 16.

Figure 13D:
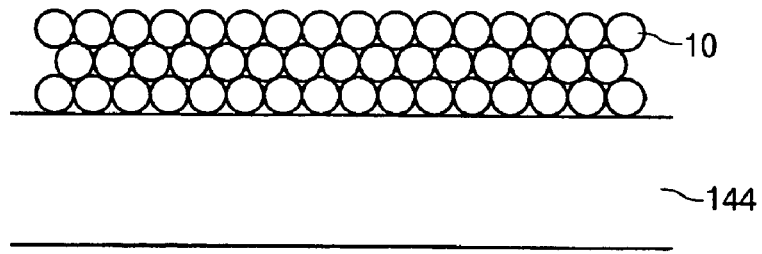

The above described operations relating to the embodiment shown in FIG. 14 may be repeated to form multiple brightness enhancement films 142; i.e. more than two. It is understood that the second layer of high molecular weight film 164 may be applied to the first photonic colloidal layer 245 by repeating the same process as is performed during formation of the first high molecular weight film 144 and the first photonic colloidal layer 246 discussed above. Similarly, it is understood that the second photonic colloidal layer 246 may be applied to the second high molecular weight film 164 by repeating the same process as is performed during formation of the first high molecular weight film 144 and the first photonic colloidal layer 246. Further, it is understood that FIGS. 13D and 14 show different embodiments of the predetermined lattice structure.

A method of manufacturing of an LCD having the brightness enhancement film 142 is discuss below with reference to FIGS. 6 through 7B and 15A through 16.

Referring an embodiment of the invention shown in FIG. 6, a first UV cross-linker 146 is dropped or placed on a diffusion film 141.

Referring to in FIGS. 7A and 7B, the first UV cross-linker 146 is uniformly coated on or applied to the diffusion film 141. It is understood that the first UV cross-linker 146 may be uniformly coated on the diffusion film 141 using any of several coating techniques.

As shown in FIG. 7A, for example, the first UV cross-linker 146 may be uniformly coated on or applied to the diffusion film 141 by a spin coating technique. As shown in FIG. 7B, for example, the first UV cross-linker 146 may be uniformly coated on or applied to the diffusion film 141 by a blading technique using a roller 55.

Figure 15A:
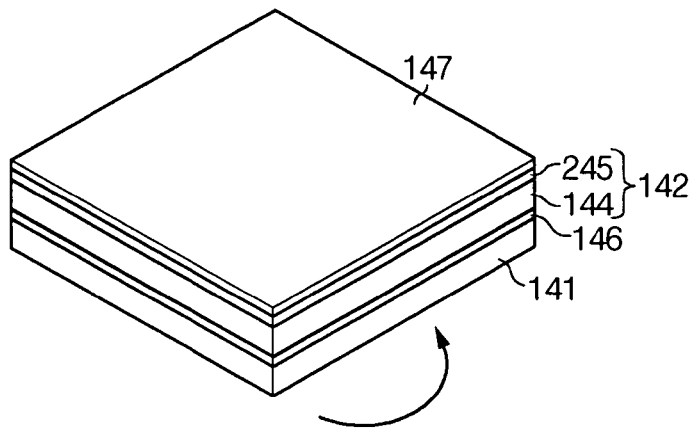
FIGS. 15A through 16 each illustrate a process of manufacturing a LCD having a brightness enhancement film according to another embodiment of the invention.
Figure 15B:
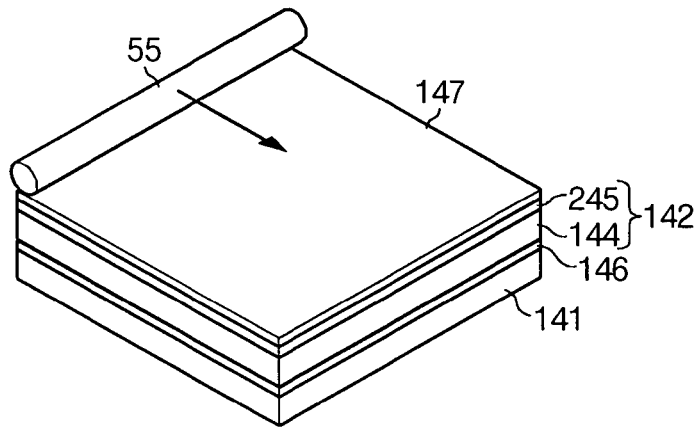

Referring to FIGS. 15A and 15B, the brightness enhancement film 142 is disposed or provided on the first UV cross-linker 146. The brightness enhancement film 142 includes a high molecular weight film 144 and a photonic colloidal layer 245 formed on the high molecular weight film 144. According to an embodiment of the invention, there are multiple photonic colloidal layers 245.

The photonic colloidal particles 10 form a predetermined lattice structure, such as (111) or (100). The photonic colloidal layer 245, which includes the photonic colloidal particles 10, has reflection-polarization properties such that the brightness enhancement film 142 al transmits P waves of light and reflects S waves of light. The reflected S waves are rebounded by the reflection film 160 and partially turned into P waves. The P waves of the rebounded light transmit the brightness enhancement film 142 and the S waves of the rebounded light are reflected again by the brightness enhancement film 142. The partial reflection and transmission of light is repeated to increase the amount of P waves provided to the display unit 130, which increases or enhances a brightness of the LCD.

Next, a second UV cross-linker 147 is dropped or placed on the brightness enhancement film 142 and uniformly distributed on the brightness enhancement film.

In other words, the second UV cross-linker 147 may be uniformly coated on the diffusion film 141 by a coating technique, such as, for example, a spin coating technique, as shown in FIG. 15A, or a blading technique using a roller 55, as shown in FIG. 15B.

Figure 16:
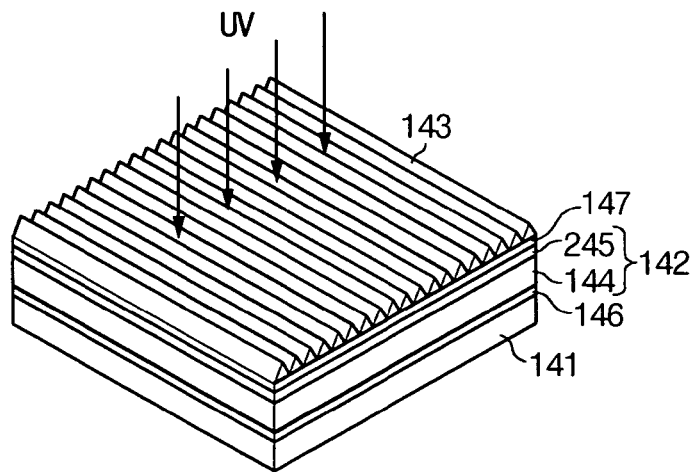

Referring to FIG. 16, a prism film 143 is disposed or provided on the second UV cross-linker 147. The first and second UV cross-linkers 146 and 147 are illuminated by UV rays to bond or connect the diffusion film 141 and the brightness enhancement film 142 with the first UV cross-linker 146 and, similarly, to bond the brightness enhancement film 142 and the prism film 143 with the second UV cross-linker 147.

The waviness or unevenness of the optical film unit 140 caused by the films 141, 142, and 143 having different expansion rates with respect to environmental conditions, such as temperature and humidity, is prevented or substantially reduced because the diffusion film 14, the brightness enhancement film 142, and the prism film 143 are tightly adhered or connected with each other.

The first and second UV cross-linker 146 and 147 are simultaneously illuminated by UV rays to bond or connect together the diffusion film 141, the brightness enhancement film 142, and the prism film 143. However, it is understood that the second UV cross-linker 147 may be coated after the first UV cross-linker 146 is illuminated by UV rays. The prism film 143 is disposed or provided on the second UV cross-linker 147 and the second UV cross-linker 147 is then illuminated by UV rays to bond or connect together the brightness enhancement film 142 and the prism film 143.

It is understood that the method of manufacturing the brightness enhancement film 142 for the LCD is not limited to the above-described embodiment. For example, an optical film unit having a single body structure may be manufactured by a roll to roll process.

Figure 17:
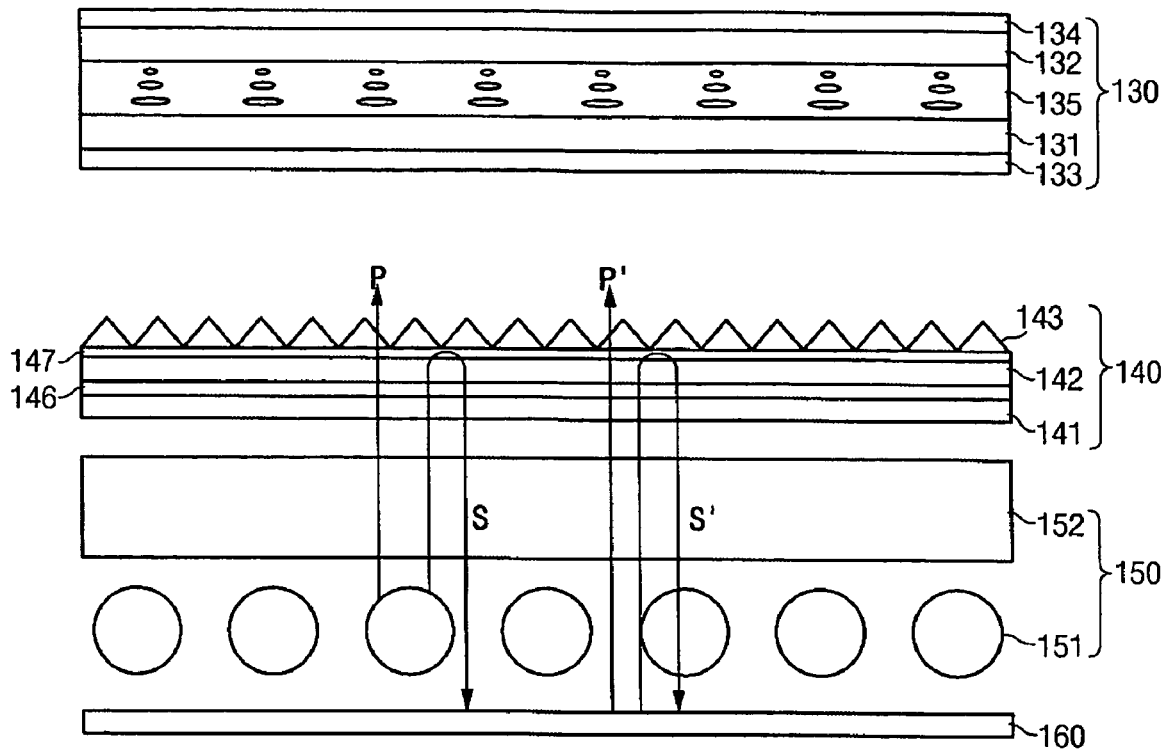
FIG. 17 is a sectional view of an LCD having a brightness enhancement film according to another embodiment of the invention.

FIG. 17 is a sectional view of an LCD having a brightness enhancement film 142 according to another embodiment of the invention. Referring to FIG. 17, an LCD 100 having a brightness enhancement film 142 includes a display unit 130 displaying images, a back light unit 150 provided under the display unit 130 and providing light to the display unit 130, and an optical film unit 140 provided between the display unit 130 and the back light unit 150 to increase or improve light luminance uniformity.

The display unit 130 includes a TFT array panel 131, a color filter array panel 132, and a liquid crystal layer 135. The display unit 130 further includes upper and lower polarizing films 133 and 134 provided on a lower side of the TFT array panel 131 and an upper side of the color filter array panel 132, respectively.

The backlight unit 150 has a plurality of lamps 151 and a light guiding panel 152 to guide the light from the lamps 151 to the display unit 130. Referring to the embodiment shown, FIG. 17, the lamps 151 are provided or located under the display unit 130 and the light guiding panel 152 (direct type back light). The light guiding panel 152 is provided under the display unit and has a size corresponding with a size of display unit 130. For example, as shown in FIG. 17, the width of the light guiding panel 152 is a uniform width. However, the light guiding panel 152 may be wedge shaped.

The optical film unit 140 for enhancing or improving uniformity of light luminance is provided on the light guiding panel 152. A reflection film 160, which reflects light back to the light guiding panel 152 to efficiently increase an amount of light sent to the display unit, is provided under or below the light guiding panel 152.

The optical film unit 140 includes multiple optical films. In other words, the optical film unit 140 includes a diffusion film 141 that defuses light received from the back light unit 150 a brightness enhancement film 142 that allows for P waves to be transmitted there through reflects S waves for recycling, and a prism film 143 that condenses light transmitted through the brightness enhancement film 142.

The brightness enhancement film 142 is provided between the diffusion film 141 and the prism film 143.

The diffusion film 141 and the brightness enhancement film 142 are adhered to or connected with each other by a first ultra violet (UV) cross-linker 146. Similarly, the brightness enhancement film 142 and the prism film 143 are adhered to or connected with each other by a second UV cross-linker 147. Therefore, the optical film unit 140 is formed as one body or structure.

The waviness or unevenness of the optical film unit 140 caused by the films 141, 142, and 143 having different expansion rates with respect to environmental conditions, such as temperature and humidity, is prevented or substantially reduced because the diffusion film 14, the brightness enhancement film 142, and the prism film 143 are tightly adhered or connected with each other.

Figure 18:
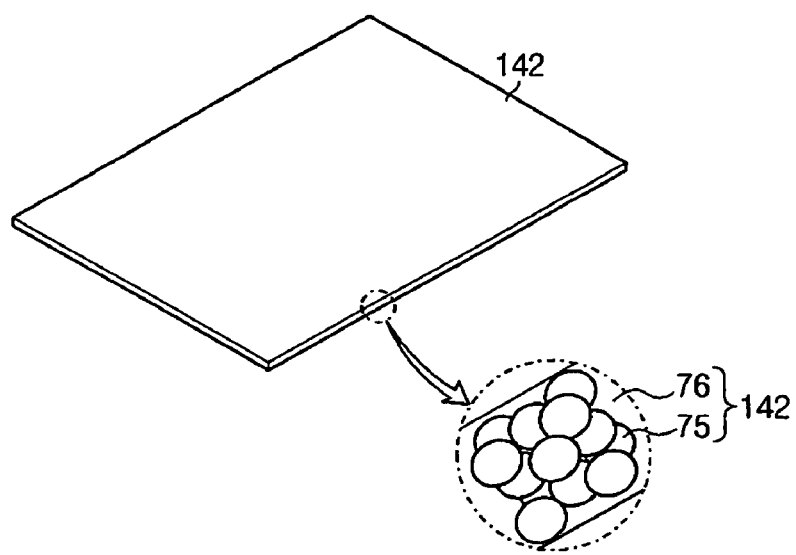
FIG. 18 illustrates a perspective view of a brightness enhancement film according to another embodiment of the invention and a partial enlarged view of the same.

FIG. 18 illustrates a perspective view of a brightness enhancement film 142 according to another embodiment of the invention and a partial enlarged view of the brightness enhancement film 142.

As shown in FIG. 18, a structure of a brightness enhancement film 142 includes a high molecular weight film 76 having a plurality of metal ion particles 75 provided thereon, For example, the metal ion particles 75 may be Ag+, Cu2+, or the like.

The metal ion particles 75 form a predetermined lattice structure, such as face centered cubic (FCC) lattice, in the high molecular weight film 76.

The high molecular weight film 76 may be made of a polycarbonate, a poly ethylene terephthalate, a polyimide, a polyamide, a polyether, a polysulfone, a polypropylene, a polymethylmethacrylate, a polypropylene, a acetylcellulose, a polymer formed by copolymerization of the above polymers, or a derivative thereof.

The brightness enhancement film 142 includes a high molecular weight film 76 having a plurality of metal ion particles 75 with reflection-polarization properties, which enable a brightness enhancement film 142 to transmit P waves of light and reflect S waves of light for recycling.

As shown in FIG. 17, light emitted from the back light unit 150 includes P waves and S waves. Only P waves are provided to the display unit 130 through the brightness enhancement film 142 and the S waves are reflected by the brightness enhancement film 142 and recycled.

The brightness enhancement film 142 transmits P waves of light having a wavelength between 250 and 800 nm and reflects S waves of light having a wavelength between 250 and 800 nm to be recycled.

The reflected S waves are rebounded by the reflection film 160 and partially turned into P waves. The P waves of the rebounded light transmit the brightness enhancement film 142 and the S waves of the rebounded light are reflected again by the brightness enhancement film 142. The partial reflection and transmission is repeated and increases the amount of P waves provided to the display unit 130, which increases or enhances a brightness of the LCD.

When the brightness enhancement film 142 is elongated in a predetermined direction with heating, the reflection-polarization properties of the brightness enhancement film 142 are enhanced. For example, since the lattice 45 formed by the metal ion particles 75 is arranged along the elongated direction, a refraction rate relating to a difference between the elongated direction and a direction that is perpendicular to the elongated direction is produced such that the reflection-polarization properties of the brightness enhancement film are improved.

For example, the brightness enhancement film 142 is preferably elongated or extended by approximately 1.1 to 8 times through the drawing with heating.

Conventional brightness enhancement film includes hundreds of thin layers. Therefore, the conventional brightness enhancement film is typically very thick, e.g., having a thickness of between 140 and 440 μm, and the manufacturing process is complex. However, since the brightness enhancement film 142 according to the present invention includes a single layer or several layers, the brightness enhancement film 142 is thin and the manufacturing process is simple, relative to the conventional brightness enhancement films.

A manufacturing method of the brightness enhancement film 142 is described hereinbelow with reference to FIGS. 19 through 21 and 23.

Figure 19:
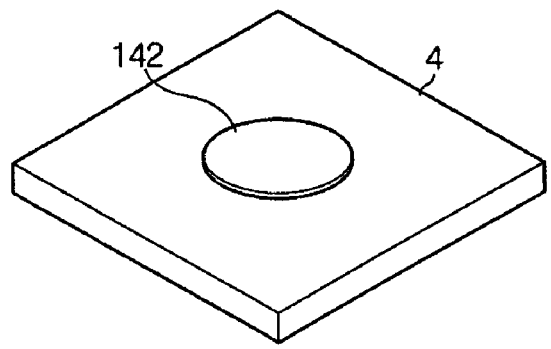
FIGS. 19 through 21 and 23 each illustrate a process of manufacturing a brightness enhancement film according to an embodiment of the invention.

Referring to an embodiment of the invention shown in FIG. 19, a solution 142 of high molecular weight resin having metal ions is dropped or provided on a glass substrate 4.

The solution 142 of high molecular weight resin having metal ions includes materials having metal ions, such as AgCl, $CuCl_2$ or the like, and a high molecular weight resin having an acid radical.

The high molecular weight resin having the acid radical may be made of a polycarbonate, a poly ethylene terephthalate, a polyimide, a polysulfone, a polymethylmethacrylate, a polystyrene, a polyvinylchloride, a polyvinylalcohol, a polynorbonene, a polymer formed by copolymerization of the above polymers, or a derivative thereof.

Figure 20A:
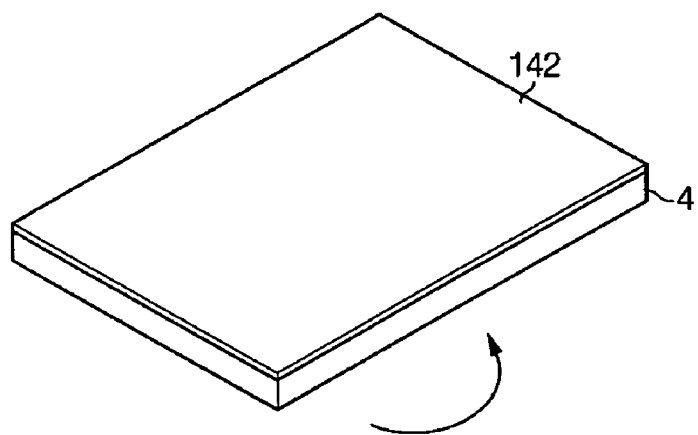
Figure 20B:
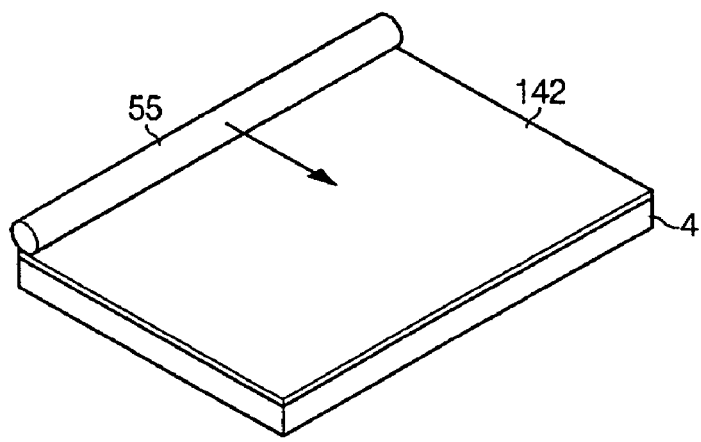

Referring to FIGS. 20A and 20B, the solution 142 of the high molecular weight resin having metal ions is uniformly coated by a coating process, such as a spin coating technique or a blading technique on the glass 4.

As shown in FIG. 20A, for example, when using the spin coating technique, the glass 4 is spun or turned to coat the solution 142 in a uniform thickness on the glass 4.

As shown in FIG. 20B, when using the blading technique is used, the solution 142 of the high molecular weight resin is spread or applied to an entire surface of the glass 4 by a roller 55.

Figure 21:
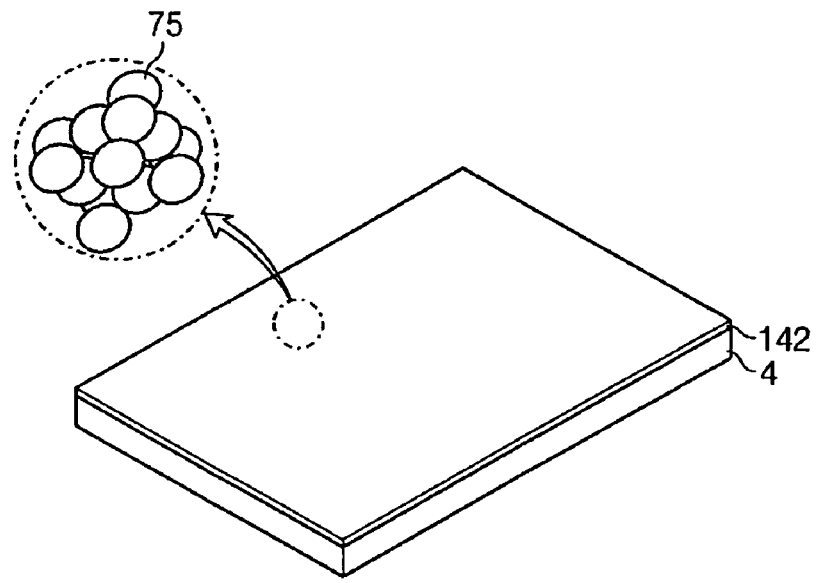

Referring to FIG. 21, the solution 142 of the high molecular weight resin having metal ions is dried to form a high molecular weight film 142. For example, the solution 142 is dried at a temperature between 4° Celsius and 100° Celsius. The solution 142 may be dried on a hot plate at a temperature between 40° Celsius and 60° Celsius to form the high molecular weight film 142 which has metal ions 75.

The acid of the high molecular weight resin of the solution is turned into water and removed through evaporation. The metal ions are reduced and attach or form onto the high molecular weight resin to form the predetermined lattice.

In other words, when the solution dries, the metal ions form metal ion particles of nanometer size and are distributed on and in the high molecular weight film 142.

The metal ion particles 75 forming a specific lattice structure have reflection-polarization properties.

Figure 22A:
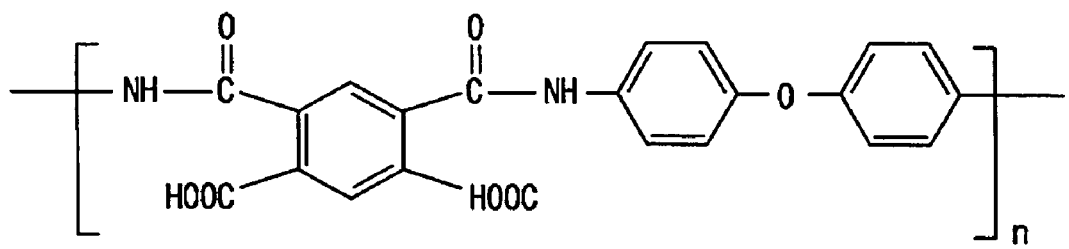
FIG. 22A is a chemical formula of a high molecular weight resin having an acid radical.
Figure 22B:
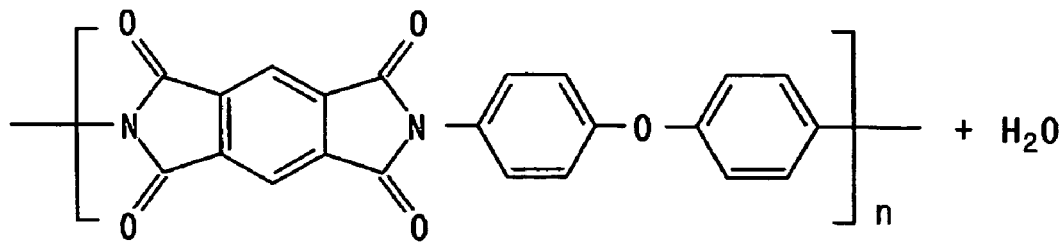
FIG. 22B is a chemical formula of polyimide formed by dehydration during drying a high molecular weight resin solution.

FIG. 22A is a chemical formula of a high molecular weight resin [poly(armic acid)] having an acid radical. FIG. 22B is a chemical formula of polyimide formed by dehydration while a high molecular weight resin solution is drying.

Figure 23:
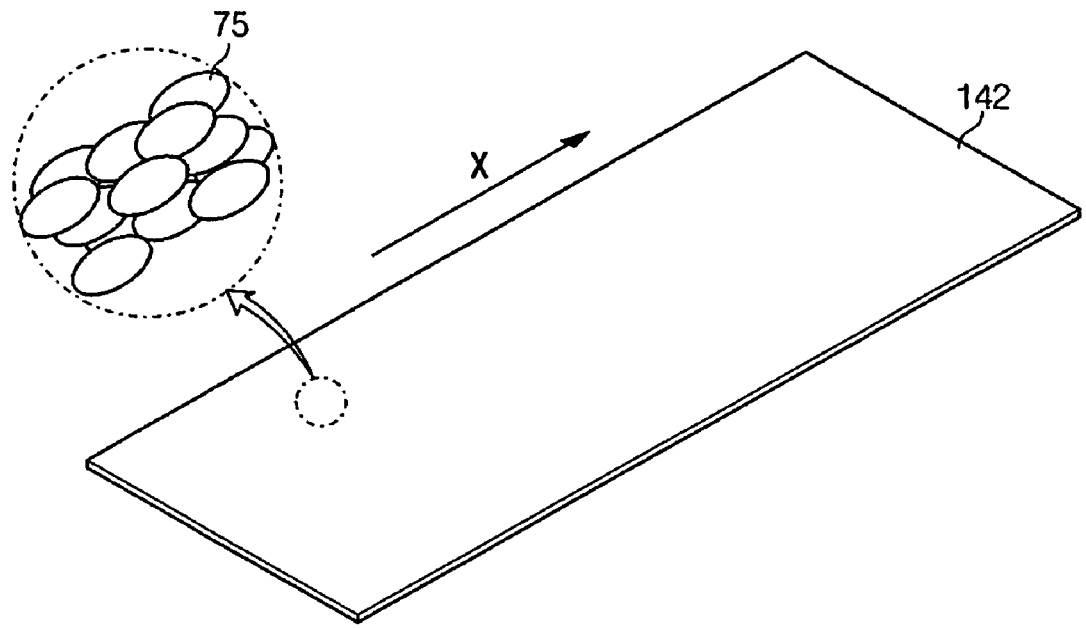

Referring to FIG. 23, the brightness enhancement film 142 is drawn or stretched to a predetermined direction, such as X direction, with heating.

The drawing of the brightness enhancement film 142 may be performed at a temperature between the glass transition temperature of the brightness enhancement film 142 and a temperature that is approximately 100° Celsius higher than the glass transition temperature. The brightness enhancement film 142 may be extended by approximately 1.1 to 8 times through the drawing with heating.

The glass transition temperature of the brightness enhancement film 142 refers to a temperature where the Brownian motion of particles included in the brightness enhancement film 142 is most active. When the drawing temperature is greater than the glass transition temperature, the brightness enhancement film 142 is more easily extended than when the drawing temperature is less than the glass transition temperature. For an example, the glass transition temperature of a poly ethylene terephthlate film is approximately 75° Celsius.

As described above and shown in FIG. 23, the brightness enhancement film 142 is elongated in an X direction with heating to enhance the reflection-polarizing properties. For example, since the metal ion particles 75 is arranged along the elongated direction, a refraction rate relating to a difference between the elongated direction and a direction that is perpendicular to the elongated direction is produced to enhance the reflection-polarization properties.

Enhancing the reflection-polarization properties of the brightness enhanced film 142 allows for P waves to be transmitted through the high molecular weight film 145 and S waves to be reflected by the brightness enhancement film 145 for recycling. As the amount of P waves provided to the display unit 130 through the brightness enhancement film 142 increases, the brightness of the LCD is enhanced.

Figure 24:
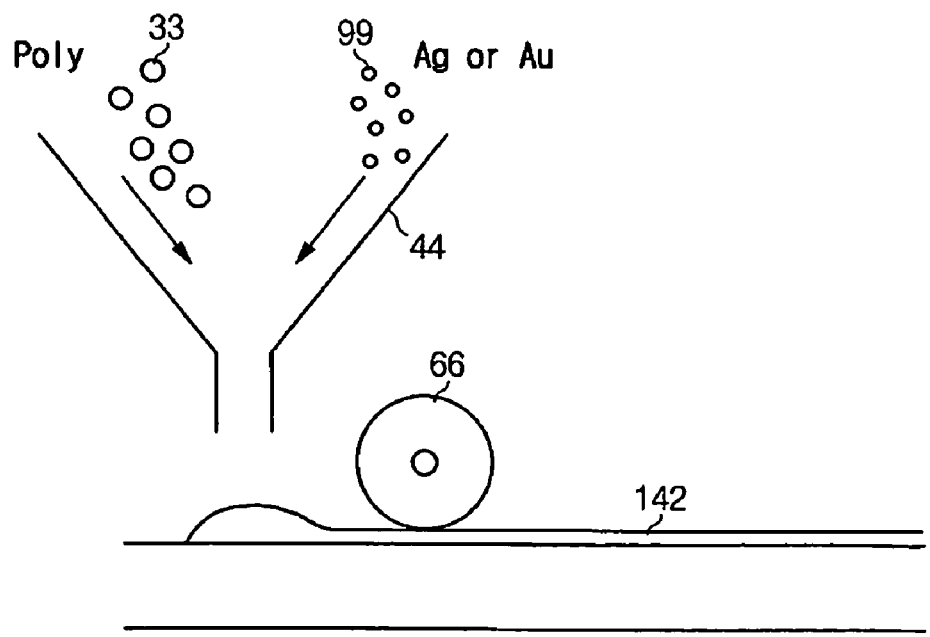
FIG. 24 illustrates a process of manufacturing a brightness enhancement film according to an embodiment of the invention.

FIG. 24 illustrates a manufacturing process of a brightness enhancement film according to an embodiment of the invention. Referring to FIG. 24, powder type high molecular weight resin particles 33 and powder type metal particles 99 are formed via casting at a temperature between the glass transition temperature of the high molecular weight resin and a temperature that is 180° Celsius higher than the glass transition temperature.

Manufacturing a high molecular weight film 142 via a casting operation includes melting the power type high molecular weight resin particles 33 and powder type metal particles 99 in a vessel 44 having a temperature sufficient to mix or combine metal particles 99 that are several nanometers in size into the high molecular weight resin, and cooling the mixture of the high molecular weight resin particles 33 and metal particles 99 using, for example, a cooling roll 66 having a temperature of approximately 100° Celsius to 140° Celsius.

The metal particles 75 distributed or arranged in the high molecular weight film may be Au, Ag, or the like. The high molecular weight resin may include a polycarbonate, a poly ethylene terephthalate, a polyimide, a polysulfone, a polymethylmethacrylate, a polystyrene, a polyvinylchloride, a polyvinylalcohol, a polynorbonene, a polymer formed by copolymerization of the above polymers, or a derivative thereof.

According to an embodiment of the invention, a concentration of the high molecular weight resin is between approximately 70 wt % and 99.9 wt %, and a concentration of the metal particles is between approximately 0.1 wt % and 30 wt %.

Although it is understood that Au or Ag metal particles 75 are costly, these particles have superior reflection-polarization properties and form well-defined lattice structures.

Referring to FIG. 23, the brightness enhancement film 142 is elongated in an X direction with heating to enhance or improve reflection-polarizing properties. For example, since the metal particles 99 are arranged along the elongated direction, a refraction rate relating to a difference between the elongated direction and a direction that is perpendicular to the elongated direction is produced to enhance the reflection-polarization properties.

A method of manufacturing an LCD having the brightness enhancement film 142 is described hereinbelow with reference to FIGS. 6 through 7B and 25A through 26.

Referring to FIG. 6, a first UV cross-linker 146 is dropped or provided on a diffusion film 141.

Referring to FIGS. 7A and 7B, the first UV cross-linker 146 is uniformly coated or applied on the diffusion film 141. It is understood that the first UV cross-linker 146 may be uniformly coated on the diffusion film 141 using any of several coating techniques.

As shown in FIG. 7A, for example, the first UV cross-linker 146 may be uniformly coated on the diffusion film 141 by a spin coating technique. As shown in FIG. 7B, for example, the first UV cross-linker 146 may be uniformly coated on the diffusion film 141 by a blading technique using a roller 55.

Figure 25A:
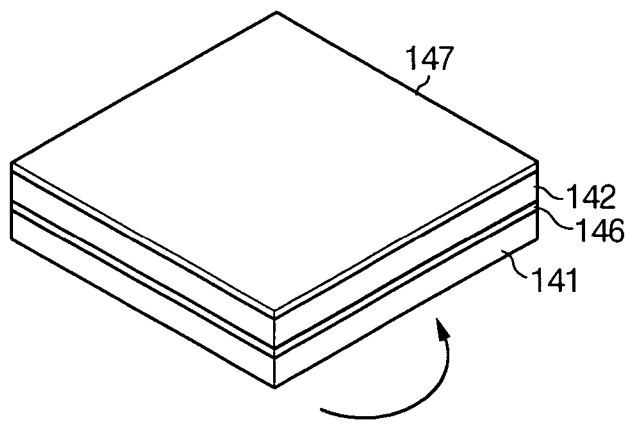
FIGS. 25A through 26 each illustrate a process of manufacturing a brightness enhancement film according to another embodiment of the invention.
Figure 25B:
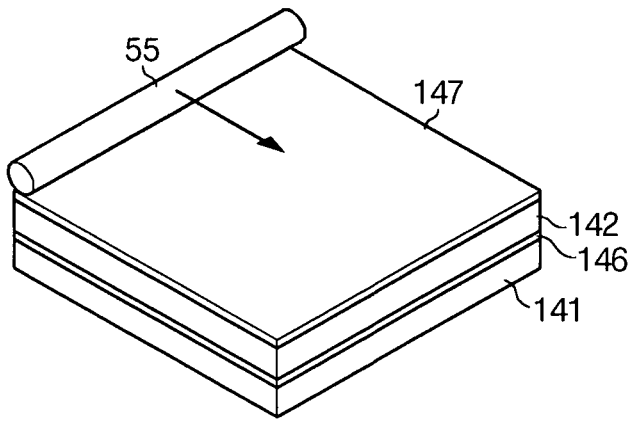

Referring to FIGS. 25A and 25B, the brightness enhancement film 142 is disposed or provided on the first UV cross-linker 146. The brightness enhancement film 142 includes a high molecular weight film 76 having a plurality of metal ion particles 75. The metal ion particles 75 may be Ag+, Cu2+, or the like.

The metal ion particles 75 form a predetermined lattice structure, such as a face centered cubic (FCC) lattice, in the high molecular weight film 76.

The brightness enhancement film 142 with the high molecular weight film 76 including the plurality of metal ion particles 75 has reflection-polarization properties such that the P waves are transmitted through the brightness enhancement film 142 and S waves are reflected form the brightness enhancement film 142 for recycling.

The reflected S waves are rebounded by the reflection film 160 and partially turned into P waves. The P waves of the rebounded light transmit or travel through the brightness enhancement film 142 and the S waves of the rebounded light are reflected again by the brightness enhancement film 142. The partial reflection and transmission is repeated to increase the P waves provided to the display unit 130, which enhance or improves a brightness of the LCD.

A second UV cross-linker 147 is dropped or provided on the brightness enhancement film 142 and uniformly distributed.

Referring to FIG. 25A, the second UV cross-linker 147 may be uniformly coated on the diffusion film 141 by a spin coating technique. Referring to FIG. 25B, the second UV cross-linker 147 may be uniformly coated on the diffusion film 141 by a blading technique using a roller 55.

Figure 26:
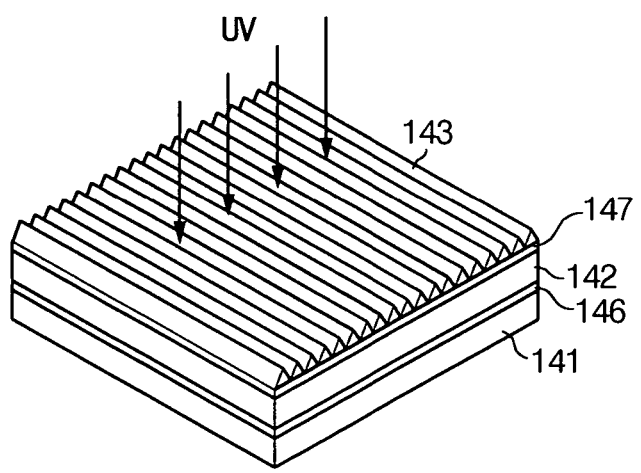

Next, as shown in FIG. 26, a prism film 143 is disposed or provided on the second UV cross-linker 147. The first and second UV cross-linkers 146 and 147 are illuminated by UV rays to bond or connect the diffusion film 141 and the brightness enhancement film 142 with the first UV cross-linker 146 and to bond or connect the brightness enhancement film 142 and the prism film 143 with the second UV cross-linker 147.

The waviness or unevenness of the optical film unit 140 caused by the films 141, 142, and 143 having different expansion rates with respect to environmental conditions, such as temperature and humidity, is prevented or substantially reduced because the diffusion film 14, the brightness enhancement film 142, and the prism film 143 are tightly adhered or connected with each other.

The first and second UV cross-linker 146 and 147 are simultaneously illuminated by UV rays to bond or connect together the diffusion film 141, the brightness enhancement film 142, and the prism film 143. However, it is understood that the second UV cross-linker 147 may be coated or applied after the first UV cross-linker 146 is illuminated by UV rays. The prism film 143 is disposed or provided on the second UV cross-linker 147 and the second UV cross-linker 147 is illuminated by UV rays to bond or connect together the brightness enhancement film 142 and the prism film 143.

It is understood that the method of manufacturing the brightness enhancement film 142 for the LCD is not limited to the above-described embodiment. For example, an optical film unit having a single body structure may be manufactured by a roll to roll process.

Figure 27:
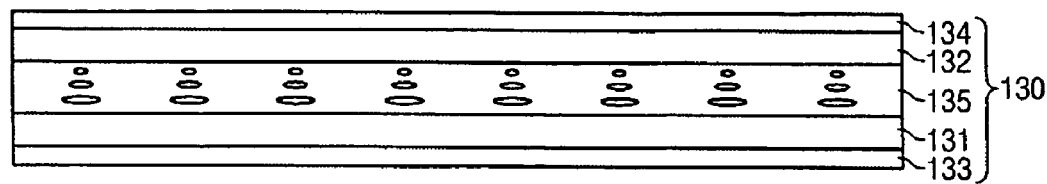
FIG. 27 a sectional view of a brightness enhancement film for an LCD according to another embodiment of the invention.
Figure 27:
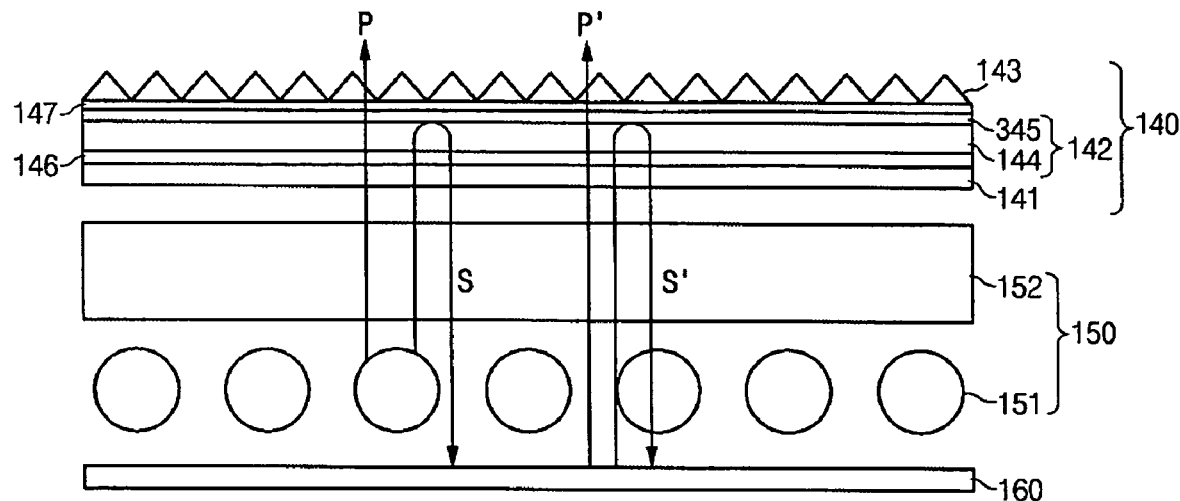

FIG. 27 a sectional view of a brightness enhancement film for an LCD according to another embodiment of the invention.

Referring to FIG. 27, an LCD 100 having a brightness enhancement film 142 includes a display unit 130 displaying images, a back light unit 150 provided under the display unit 130 and providing light to the display unit 130, and an optical film unit 140 provided between the display unit 130 and the back light unit 150 to increase or improve light luminance uniformity.

The display unit 130 includes TFT array panel 131, a color filter array panel 132, and a liquid crystal layer 135. The display unit 130 further includes upper and lower polarizing films 133 and 134 provided on a lower side of the TFT array panel 131 and on an upper side of the color filter array panel 132, respectively.

The backlight unit 150 has a plurality of lamps 151 and a light guiding panel 152 to guide the light from the lamps 151 to the display unit 130. Referring to FIG. 27 the lamps 151 are provided under the display unit 130 and the light guiding panel 152 (direct type back light). The light guiding panel 152 is provided under the display unit and has a size corresponding with a size of the display unit 130. For examples as shown in FIG. 27, the width of the light guiding panel 152 is uniform. However, the light guiding panel 152 may be wedge shaped.

The optical film unit 140 for enhancing or improve uniformity of light luminance is provided on the light guiding panel 152. A reflection film 160 that reflects light to the light guiding panel 152 to efficiently increase an amount of light sent to the display unit 130 is provided under or below the light guiding panel 152.

The optical film unit 140 includes multiple of optical films. In other words, the optical film unit 140 includes a diffusion film 141 that diffuses light from the back light unit 150 to enhance light illumination uniformity, a brightness enhancement film 142 allowing for the transmission of P waves and reflects S waves for recycling, and a prism film 143 to condense light.

The brightness enhancement film 142 is provided between the diffusion film 141 and the prism film 143.

The diffusion film 141 and the brightness enhancement film 142 are adhered to or connected with each other by a first ultra violet (UV) cross-linker 146. Similarly, the brightness enhancement film 142 and the prism film 143 are adhered to or connected with each other by a second UV cross-linker 147. Therefore, the optical film unit 140 is formed as one body or structure.

The waviness or unevenness of the optical film unit 140 caused by the films 141, 142, and 143 having different expansion rates with respect to environmental conditions, such as temperature and humidity, is prevented or substantially reduced because the diffusion film 14, the brightness enhancement film 142, and the prism film 143 are tightly adhered or connected with each other.

Figure 31:
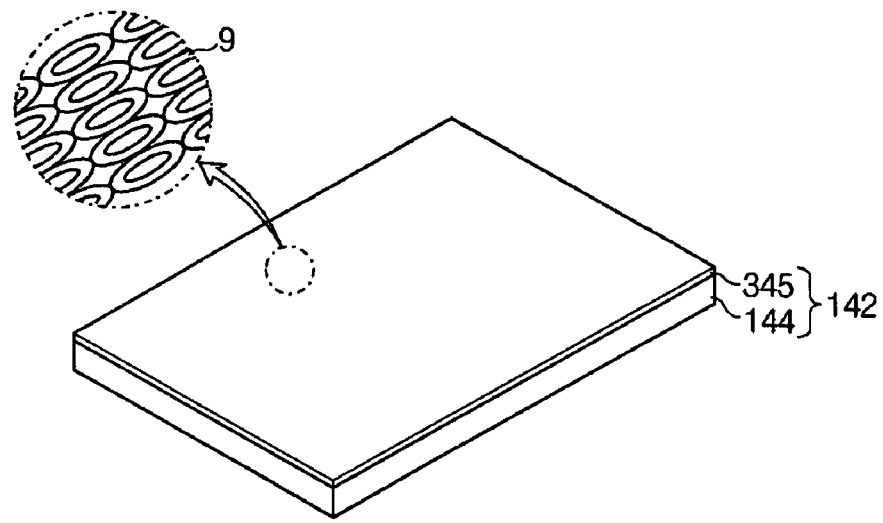

FIG. 31 illustrates a perspective view of a brightness enhancement film 142 according to another embodiment of the invention and a partial enlarged view of the brightness enhancement film 142.

As shown in FIGS. 27 and 31, the brightness enhancement film 142 includes a high molecular weight film 144 and a liquid crystal layer 245 or provided on the high molecular weight film 144. For example, a plurality of the brightness enhancement films 142 may be included in the optical film unit 140.

The high molecular weight film 144 may be made of a polycarbonate, a poly ethylene terephthalate, a polyimide, a polyamide, a polyether, a polysulfone, a polypropylene, a polymethylmethacrylate, a polypropylene, a acetylcellulose, a polymer formed by copolymerization of the above polymers, or a derivative thereof.

The liquid crystal layer 345 has a plurality of encapsulated liquid crystal molecules 9 and the encapsulated liquid crystal molecules may have a micelle structure.

Figure 28:
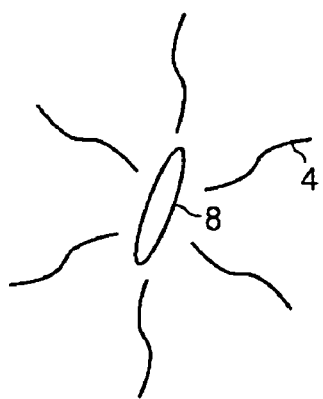
FIG. 28 illustrates a liquid crystal molecule having micelle structure.

In other words, as shown in FIG. 28, the micelle structure is formed by a liquid crystal molecule 8 and a plurality of high molecular particles 4 surrounding the liquid crystal molecule. A liquid crystal molecule surrounded by a plurality of high molecular particles is referred to as an encapsulated liquid crystal molecule. A hydrophilic portion of the high molecular particle 4 faces outside. A hydrophobic portion of the high molecular particle 4 faces a liquid crystal molecule 9. The encapsulated liquid crystal molecules 9 are parallel with each other.

The encapsulated liquid crystal molecules 9 are each several tens of nanometers to several hundreds of nanometers in size.

The liquid crystal layer 345 with liquid crystal molecules 9 has reflection-polarization properties.

As shown in FIG. 27, light emitted from the back light unit 150 includes P waves and S waves. Only the P waves are provided or transmitted to the display unit 130 through the brightness enhancement film 142. The S waves are reflected by the brightness enhancement film 142 and recycled.

The brightness enhancement film 142 allows transmission of P waves of light having a wavelength of approximately 250 to 800 nm and reflects S waves of light having a wavelength of approximately 250 to 800 nm for recycling.

The reflected S waves are rebounded by the reflection film 160 and partially turned into P waves. The P waves of the rebounded light transmit or travel through the brightness enhancement film 142 and the S waves of the rebounded light are reflected again by the brightness enhancement film 142. The partial reflection and transmission is repeated to increase the amount of P waves provided to the display unit 130, which enhances or improves a brightness of the LCD.

The reflection-polarization properties of the brightness enhancement film 142 are enhanced by disposing or providing multiple liquid crystal layers 345.

When the brightness enhancement film 142 is extended in a predetermined direction with heating, the reflection-polarization properties of the brightness enhancement film 142 are improved or enhanced. That is, since the long axis of the liquid crystals 9 are arranged in the elongated direction of the brightness enhancement film 142, difference of refraction rate between the elongated direction and a direction that is perpendicular to the elongated direction is produced to enhance or improve the reflection-polarization properties.

For example, the brightness enhancement film 142 may be elongated by approximately 1.1 to 8 times through the drawing with heating.

Conventional brightness enhancement films have hundreds of thin layers. Therefore, the conventional brightness enhancement film is thick, e.g., having a thickness of 140 to 440 μm, and the manufacturing process is complex. However, since the brightness enhancement film 142 of the invention include a single layer or several layers, the brightness enhancement film 142 is thin and the manufacturing process is simple, relative to the conventional brightness enhancement films.

A method of manufacturing the brightness enhancement film 142 is described hereinbelow with reference to FIGS. 29 though 32.

Figure 29:
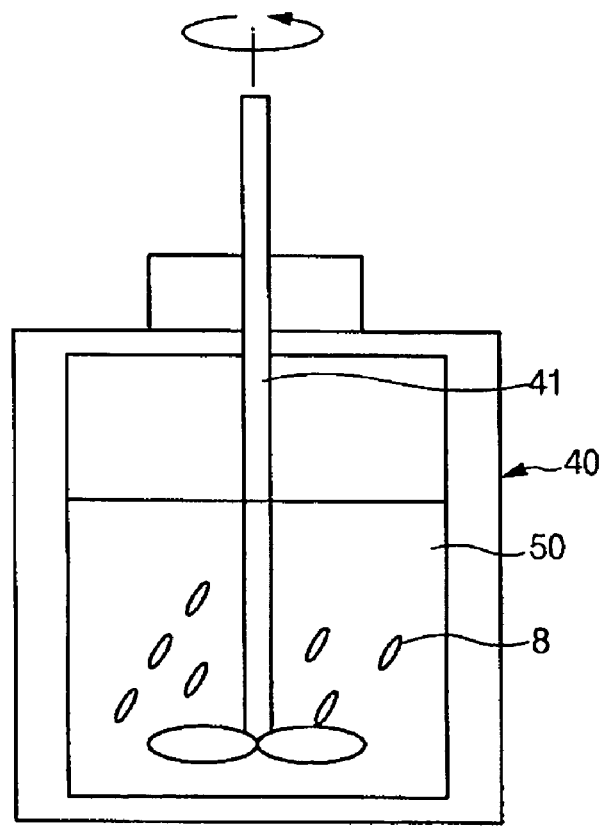
FIG. 29 is a sectional view of a reactor for manufacturing encapsulated liquid crystal.

Referring to FIG. 29, a plurality of encapsulated liquid crystal molecules 8 are manufactured using a reactor device 40. A manufacturing method of the encapsulated liquid crystal molecules 8 is described below. Specifically, approximately 450 g of deionized water (DI water), and approximately 0.3 g of sodium styrene sulfonate used as an emulsifier or surfactant are put into a reactor 40.

The temperature inside of the reactor 40 is approximately 80° Celsius and maintained as such while an agitator 41 inside of the reactor 40 is spun over 350 rpm for about 10 minutes to agitate substances in the reactor 40. That is, two or more of substance having different physical and chemical characteristics are homogeneously mixed by external mechanical energy.

Fifty (50) g of styrene monomers 50 are put into the reactor 4, after the agitation process discussed above is complete.

Approximately one hour later, approximately 0.25 g of potassium persulfate is inserted into the reactor 40 as an initiator and polymerization occurs in a nitrogen atmosphere for approximately 3 hours to form an encapsulated liquid crystal. The encapsulated liquid crystal has a colloid state.

At this time, as shown in FIG. 28, high molecular particles 4 of the styrene monomers 50 surround a liquid crystal 8 to form the micelle structure (previously discussed).

For example, the encapsulated liquid crystal molecules are each of several tens of nanometers to several hundreds of nanometers in size.

Figure 30:
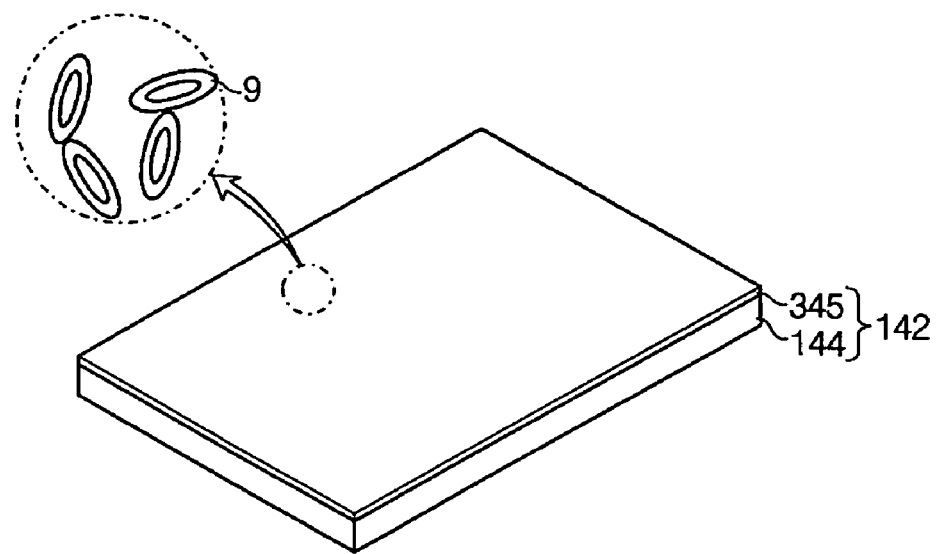
FIGS. 30 through 32 each illustrate a process of manufacturing a brightness enhancement film according to another embodiment of the invention.

Referring to FIG. 30, the encapsulated liquid crystal molecules 9 are coated on a high molecular weight film 144 and form the liquid crystal layer 345. At this time, the directions of the long axis of the encapsulated liquid crystal molecules 9 are random and not parallel with each other.

The high molecular weight film 144 may be made of may be made of a polycarbonate, a poly ethylene terephthalate, a polyimide, a polyamide, a polyether, a polysulfone, a polypropylene, a polymethylmethacrylate, a polypropylene, a acetylcellulose, a polymer formed by copolymerization of the above polymers, or a derivative thereof Referring to FIG. 31, the long axis of the encapsulated liquid crystal molecules 9 are aligned or positioned in a predetermined direction by either rubbing the liquid crystal layer 345 or applying an electric field to the liquid crystal layer.

The liquid crystal layer 345 with the aligned encapsulated liquid crystal molecules 9 has reflection-polarization properties. That is, the reflection-polarization properties are exhibited by optical anisotropy, e.g., polarized light, of the encapsulated liquid crystal molecules 9. It is understood that the rubbing process to align the encapsulated liquid crystal molecules 9 may be performed regardless of dry or wet state of the liquid crystals.

Referring to FIG. 27, light emitted from the back light unit 150 includes P waves and S waves. Only the P waves are provided pr transmitted to the display unit 130 through the brightness enhancement film 142. The S waves are reflected by the brightness enhancement film 142 and recycled.

The brightness enhancement film 142 allows for the transmission of P waves of light having wavelength of 250 to 800 nm and reflects S waves of light having a wavelength of 250 to 800 nm for recycling purposes The reflected S waves are rebounded by the reflection film 160 and partially turned into P waves. The P waves of the rebounded light transmit the brightness enhancement film 142 and the S waves of the rebounded light are reflected again by the brightness enhancement film 142. The partial reflection and transmission is repeated to increase the amount of P waves provided or transmitted to the display unit 130, which increases or enhances a brightness of the LCD.

The above-described process may be repeated to form multiple brightness enhancement films 142.

Figure 32:
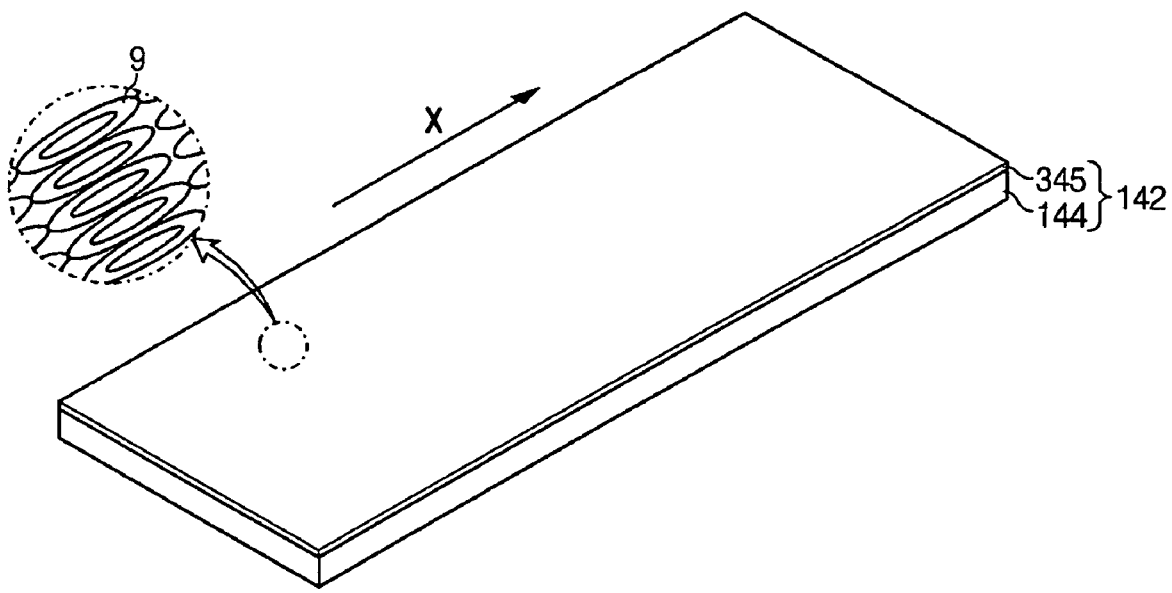

Referring to FIG. 32, the brightness enhancement film 142 is drawn to a predetermined direction, such as an X direction, with heating.

The drawing of the brightness enhancement film 142 may be performed at a temperature between the glass transition temperature of the brightness enhancement film 142 and a temperature that is 100° Celsius higher than the glass transition temperature. The brightness enhancement film 142 may be extended by 1.1 to 8 times through the drawing with heating.

The glass transition temperature of the brightness enhancement film 142 refers to a temperature where the Brownian motion of particles included in the brightness enhancement film 142 is most active. When the temperature of the brightness enhancement film 142 is over the glass transition temperature, the brightness enhancement film 142 is more easily elongated. For example, the glass transition temperature of a poly ethylene terephthlate film is approximately about 75° Celsius.

As described above, the brightness enhancement film 142 may be elongated in the X direction with heating to enhance or improve reflection-polarizing properties. That is, since the liquid crystal molecules 9 are arranged along the elongated direction of the brightness enhancement film 142, a difference of refraction rate between the elongated direction and a direction that is perpendicular to the elongated direction is produced to enhance or improve the reflection-polarization properties.

Enhancing the reflection-polarization characteristics allow for the transmission of P waves and the reflection of S waves for recycling. Thus, the amount of P waves provided or transmitted to the display unit 130 through the brightness enhancement film 142 increases, which improve or enhance a brightness of the LCD.

A method of manufacturing an LCD having the brightness enhancement film 142 is described hereinbelow with reference to FIGS. 6 through 7B and 33A through 34.

Referring to FIG. 6, a first UV cross-linker 146 is dropped or provided on a diffusion film 141.

Referring to FIGS. 7A and 7B, the first UV cross-linker 146 is uniformly coated or applied on the diffusion film 141.

The first UV cross-linker 146 may be uniformly coated on the diffusion film 141 by a coating process, such as a spin coating technique shown in FIG. 7A, or a blading technique with a roller 55, as shown in FIG. 7B.

Figure 33A:
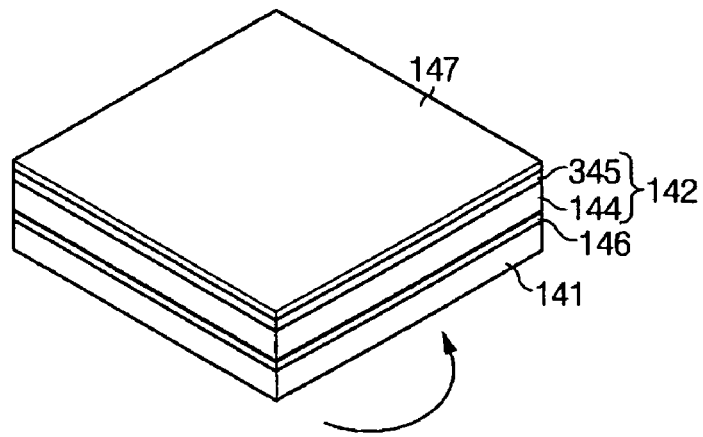
FIGS. 33a through 34 each illustrate a process of manufacturing a LCD having a brightness enhancement film according to another embodiment of the invention.
Figure 33B:
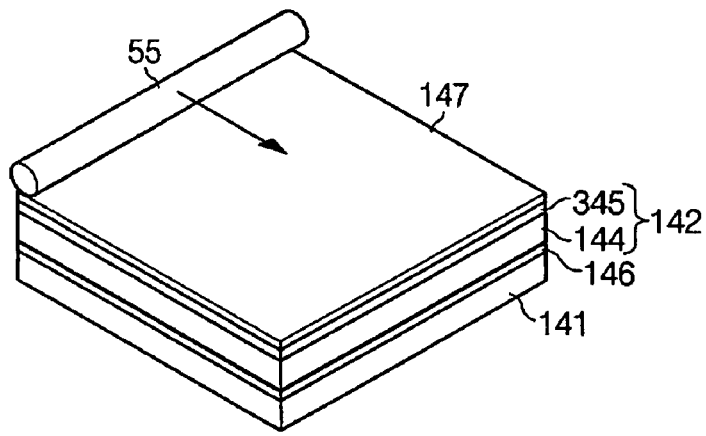

Referring to FIGS. 33A and 33B, the brightness enhancement film 142 is disposed or provided on the first UV cross-linker 146. For example, the brightness enhancement film 142 may include a high molecular weight film 144 and a liquid crystal layer 345, which are formed of the encapsulated liquid crystal molecules and are formed on the high molecular weight film 144. The encapsulated liquid crystal molecules are aligned in a direction to be parallel with the elongated direction of the brightness enhancement film 142.

The liquid crystal layer 345 has of reflection-polarization properties, which are shown by optical anisotropy, e.g., polarized light, of the encapsulated liquid crystal molecules 9.

The brightness enhancement film 142 allows for the transmission of P waves of light and reflects S waves of light. The reflected S waves are rebounded by the reflection film 160 and partially turned into P waves. The P waves of the rebounded light transmit the brightness enhancement film 142 and the S waves of the rebounded light are reflected again by the brightness enhancement film 142. The partial reflection and transmission is repeated to increase the amount of P waves provided to the display unit 130, which increases or improves a brightness of the LCD.

A second UV cross-linker 147 is dropped or provided on the brightness enhancement film 142 and uniformly distributed.

The second UV cross-linker 147 may be uniformly coated on the diffusion film 141 by spin coating, as shown in FIG. 33A or the second UV cross-linker 147 may be uniformly coated on the diffusion film 141 by blading with a roller 55, as shown in FIG. 33B. It is understood that the coating techniques are not limited to the above described techniques.

Figure 34:
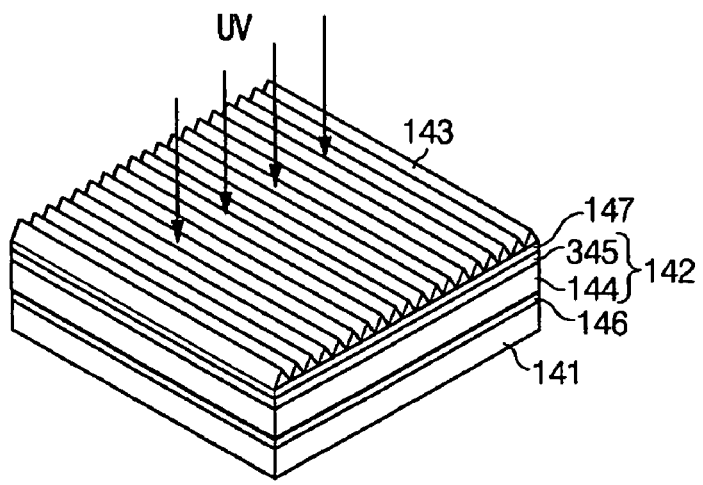

Referring to FIG. 34, a prism film 143 is disposed or provided on the second UV cross-linker 147. The first and second UV cross-linkers 146 and 147 are illuminated by UV rays to bond or connect the diffusion film 141 and the brightness enhancement film 142 with the first UV cross-linker 146 and to bond the brightness enhancement film 142 and the prism film 143 with the second UV cross-linker 147, respectively.

The waviness or unevenness of the optical film unit 140 caused by the films 141, 142, and 143 having different expansion rates with respect to environmental conditions, such as temperature and humidity, is prevented or substantially reduced because the diffusion film 14, the brightness enhancement film 142, and the prism film 143 are tightly adhered or connected with each other.

According to the invention, the first and second UV cross-linker 146 and 147 may be simultaneously illuminated by UV rays to bond or connect together the diffusion film 141, the brightness enhancement film 142, and the prism film 143. However, it is understood that the second UV cross-linker 147 may be coated or applied after the first UV cross-linker 146 is illuminated by UV rays. The prism film 143 is then disposed or provided on the second UV cross-linker 147 and the second UV cross-linker 147 is illuminated to bond or connect the brightness enhancement film 142 and the prism film 143.

It is understood that the method of manufacturing the brightness enhancement film 142 for the LCD is not limited to the above-described embodiment. For example, an optical film unit having a single body structure may be manufactures by a roll to roll process.

Figure 35:
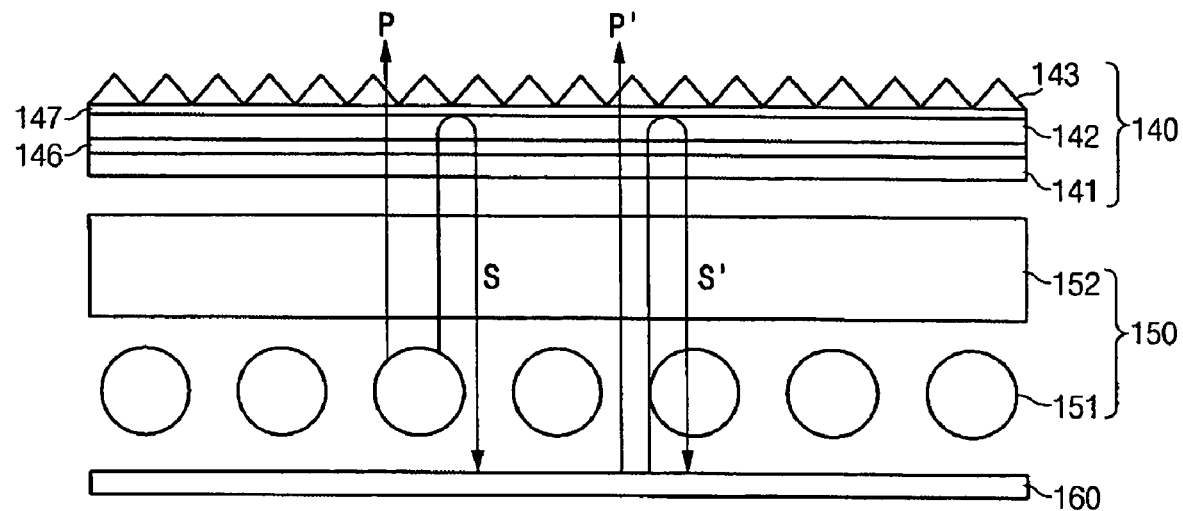
FIG. 35 is a sectional view of an LCD having a brightness enhancement film according to another embodiment of the invention.

FIG. 35 is a sectional view of an LCD having a brightness enhancement film according to another embodiment of the invention.

Referring to an embodiment of the invention shown in FIG. 35, an LCD 100 having a brightness enhancement film includes a display unit 130 displaying images, a back light unit 150 provided under the display unit 130 and providing or transmitting light to the display unit 130, and an optical film unit 140 provided between the display unit 130 and the back light unit 150 to increase light luminance uniformity.

The display unit 130 includes a TFT array panel 131, a color filter array panel 132, and a liquid crystal layer 135. The display unit 130 further includes upper and lower polarizing films 133 and 134 provide on a lower side of the TFT array panel 131 and an upper side of the color filter array panel 132, respectively.

The backlight unit 150 includes multiple lamps 151 and a light guiding panel 152 to guide the light from the lamps 151 to the display unit 130. FIG. 35 shows lamps 151 provided under or below the display unit 130 and the light guiding panel 152 (direct type back light). The light guiding panel 152 is provided under the display unit and has a size corresponding with a size of the display unit 130. In FIG. 35, the light guiding panel 152 is shown having a uniform width. However, the light guiding panel may be wedge shaped, or non-uniform.

The optical film unit 140 for enhancing light luminance uniformity is provided on the light guiding panel 152. A reflection film 160 that reflects light back to the light guiding panel 152 to more efficiently increase an amount of transmitted to the light is provided under or below the light guiding panel 152.

The optical film unit 140 includes multiple of optical films. For example, the optical film unit 140 includes a diffusion film 141 that diffuses light from the back light unit 150 to enhance light illumination uniformity, a brightness enhancement film 142 that allows for the transmission of P waves and reflects S waves for recycling, and a prism film 143 to condense light.

The brightness enhancement film 142 is provides on the diffusion film 141 and the prism film 143 is provided on the brightness enhancement film 142.

The diffusion film 141 and the brightness enhancement film 142 are adhered or connected to each other by a first UV cross-linker 146. The brightness enhancement film 142 and the prism film 143 are adhered or connected to each other by a second UV cross-linker 147. Therefore, the optical film unit 140 is formed as one body or structure.

The waviness or unevenness of the optical film unit 140 caused by the films 141, 142, and 143 having different expansion rates with respect to environmental conditions, such as temperature and humidity, is prevented or substantially reduced because the diffusion film 14, the brightness enhancement film 142, and the prism film 143 are tightly adhered or connected with each other.

Figure 36:
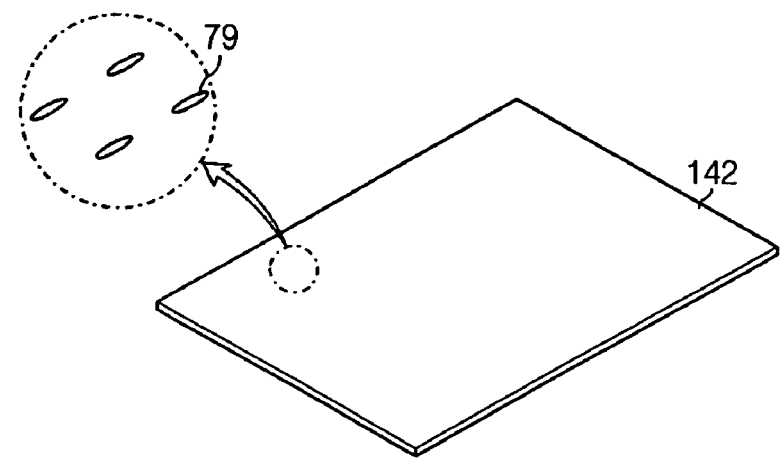
FIG. 36 illustrates a perspective view of a brightness enhancement film according to another embodiment of the invention and a partial enlarged view of the same.
Figure 37:
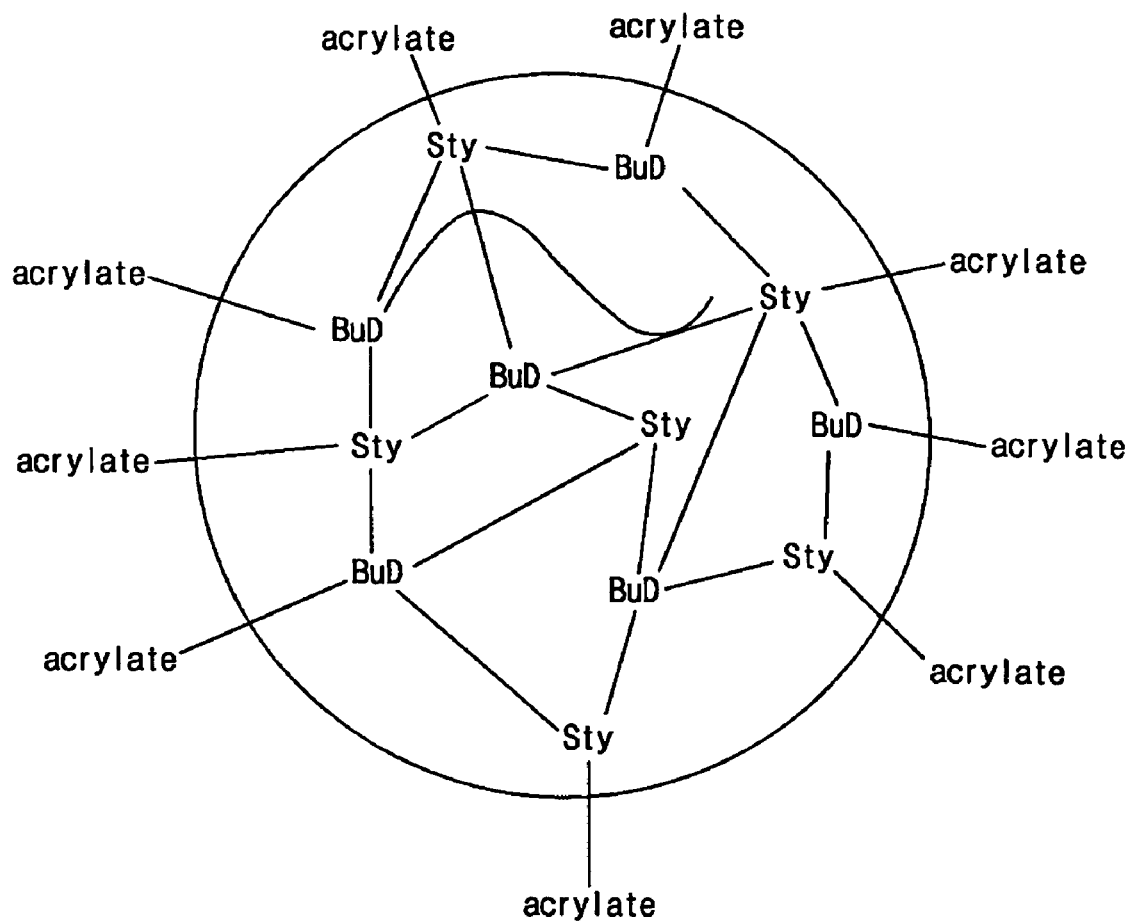
FIG. 37 is a chemical formula of an organic particles having core shell structure.

FIG. 36 illustrates a perspective view of a brightness enhancement film 142 according to another embodiment of the invention and a partial enlarged view of the brightness enhancement film 142. FIG. 37 is a chemical formula of an organic particle having a core shell structures.

Referring to the embodiment of the invention shown in FIGS. 36 and 37, the brightness enhancement film 142 includes a high molecular weight film having a plurality of organic particles with a core shell structure and distributed or positioned in the high molecular weight film. The organic particles 79 having the core shell structure may be made of methacylate butadiene styrene.

The core shell structure includes a core made of butadiene and a cross-linked portion of styrene and a shell of polymethyl methacrylate, which surrounds the core.

Butadiene and styrene are connected with each other and form a mesh-like structure and polymethyl methacrylate surrounds the butadiene and styrene.

Referring to FIG. 37, Sty represents styrene, BuD represents Butadiene, and acrylate represents methacylate and methyl methacrylate.

The brightness enhancement film 142 is elongated pr extended in a predetermined direction with heating to manifest reflection-polarizing properties. That is, since the organic particles 79 having core shell structure are arranged along the elongated direction of the brightness enhancement film 142, a difference of refraction rate between the elongated direction and a direction that is perpendicular to the elongated direction is produced to manifest the reflection-polarization characteristics.

In other words, the elongated organic particles 79 having the core shell allow for the transmission of P waves through the brightness enhancement film 142 and reflect S waves for recycling purposes. For example, the brightness enhancement film 142 is preferably elongated, or extended by approximately 1.1 to 8 times through the drawing with heating.

Referring to FIG. 35, light emitted from the back light unit 150 includes P waves and S waves. Only the P waves are provided or transmitted to the display unit 130 through the brightness enhancement film 142. The S waves are reflected by the brightness enhancement film 142 and recycled.

The brightness enhancement film 142 allows for the transmission of P waves of light having a wavelength of 250 to 800 nm and reflects S waves of light having a wavelength of 250 to 800 nm for recycling proposes.

The reflected S waves are rebounded by the reflection film 160 and partially turned into P waves. The P waves of the rebounded light transmit the brightness enhancement film 142 and the S waves of the rebounded light are reflected again by the brightness enhancement film 142. The partial reflection and transmission is repeated to increase the amount of P waves provided or transmitted to the display unit 130, which increases or enhances a brightness of the LCD Conventional brightness enhancement film has hundreds of thin layers. Therefore, the conventional brightness enhancement film is thick, e.g., having a thickness of 140 to 440 μm, and the manufacturing process of the brightness enhancement film is complex. However, since the brightness enhancement film 142 of the invention includes a single layer or several layers, the brightness enhancement film 142 is thin and the manufacturing process is simple relative to the conventional brightness enhancement film.

A method of manufacturing the brightness enhancement film 142 is described hereinbelow with reference to FIGS. 38 and 39.

Figure 38:
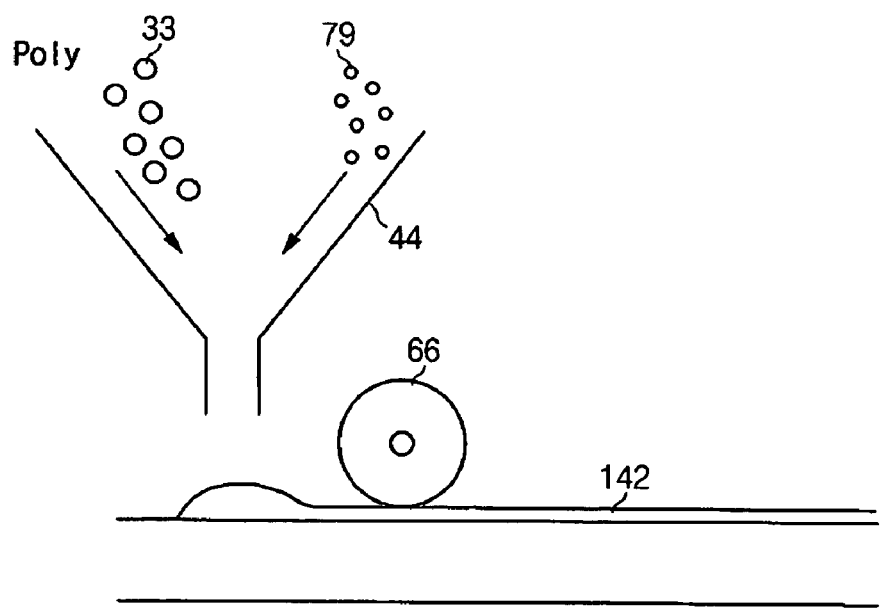
FIGS. 38 through 40 each illustrate a process of manufacturing a brightness enhancement film according to an embodiment of the invention.

Referring to the embodiment of the invention shown in FIG. 38, powder type high molecular weight resin particles 33 and powder type organic particles 79 having a core shell structure formed via a casting operation at a temperature between a glass transition temperature of the high molecular weight resin and 180° Celsius higher than the glass transition temperature.

Forming the high molecular weight film 142 via the casting operation includes melting the power type high molecular weight resin particles 33 and powder type organic particles 79 in a vessel 44 having a temperature sufficient to mix or combine the organic particles 79 into the high molecular weight resin, and cooling the mixture of the high molecular weight resin and the organic particles 79 using, for example, a cooling roll 66 having a temperature of approximately 100° Celsius to 140° Celsius.

Figure 39:
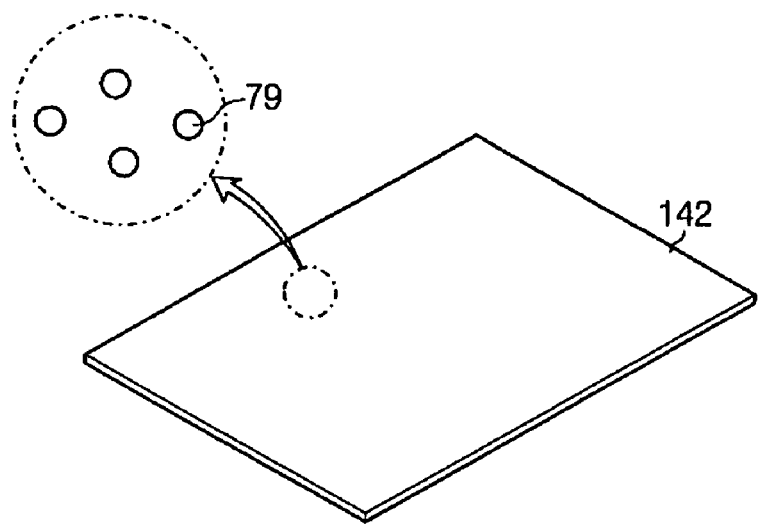

Referring to FIG. 39, the organic particles 79, which are made of methacylate butadiene styrene and have a core shell structure, are dispersed or provided in the high molecular weight film 142.

The high molecular weight resin may include a polycarbonate, a poly ethylene terephthalate, a polyimide, a polysulfone, a polymethylmethacrylate, a polystyrene, a polyvinylchloride, a polyvinylalcohol, a polynorbonene, a polymer formed by copolymerization of the above polymers, or a derivative thereof.

According to an embodiment of the invention, a concentration of the high molecular weight resin is between approximately 70 wt % and 99 wt %, and a concentration of the organic particles is between approximately 1 wt % and 30 wt %.

Figure 40:
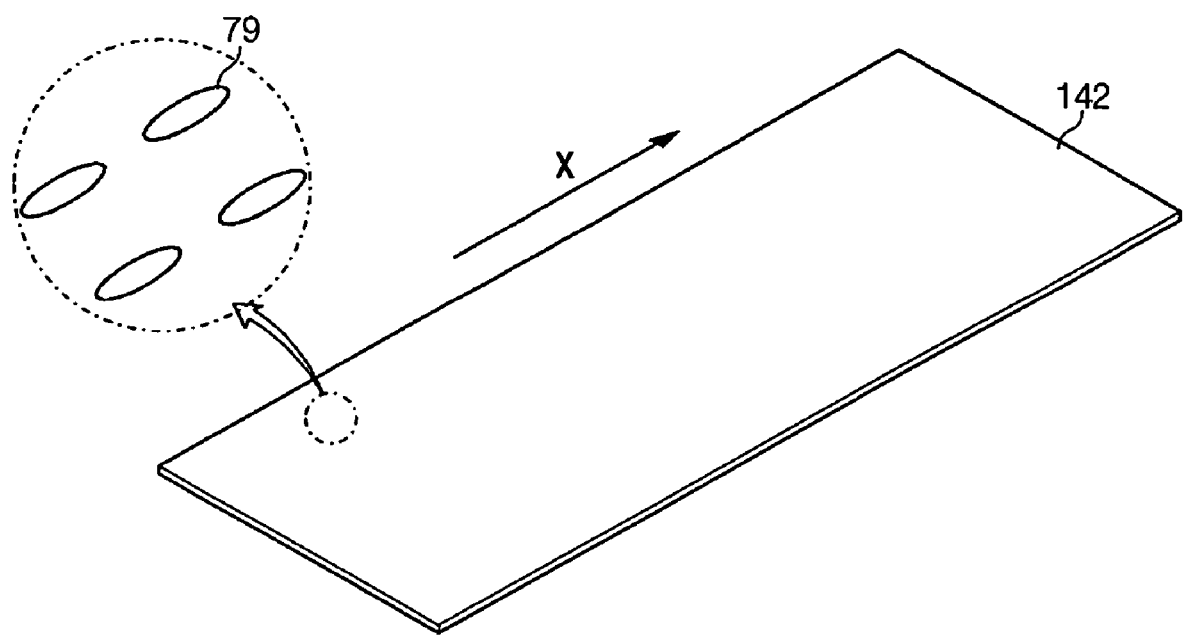

Referring to FIG. 40, the brightness enhancement film 142 is drawn to a predetermined direction, such as an X direction, with heating to increase the size of X direction, e.g., elongate the brightness enhancement film 142, and to manifest the reflection-polarization properties. That is, since the organic particles 79 having the core shell structure are arranged along an elongated direction of the brightness enhancement film 142, a difference of refraction rate between the elongated direction and a direction that is perpendicular to the elongated direction is produced to manifest the reflection-polarization properties.

A method of manufacturing an LCD having the brightness enhancement film 142 is described hereinbelow with reference to FIGS. 6 through 7B and 41A through 42.

Referring to FIG. 6, a first UV cross-linker 146 is dropped or provided on a diffusion film 141.

Referring to FIGS. 7A and 7B, the first UV cross-linker 146 is uniformly coated or applied on the diffusion film 141. The first UV cross-linker 146 may be uniformly coated on the diffusion film 141 by a spin coating technique, or by a blading technique using a roller 55, as shown in FIG. 7B.

Figure 41A:
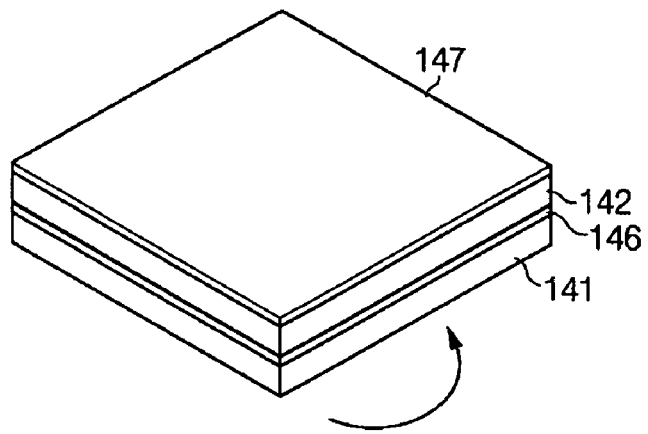
FIGS. 41 through 42 each illustrate a process of manufacturing a LCD having a brightness enhancement film according to another embodiment of the invention.
Figure 41B:
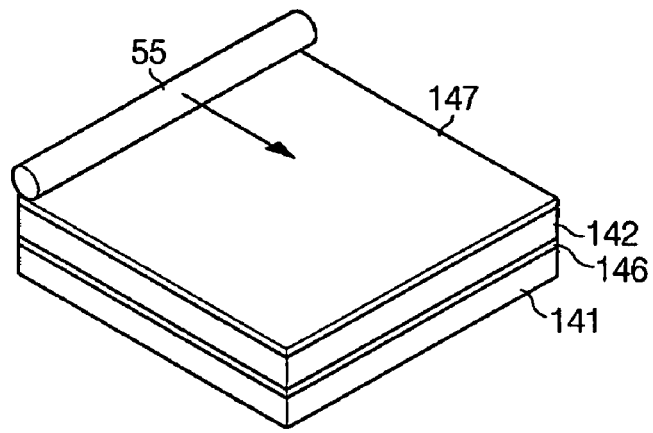

Referring to FIGS. 41A and 41B, the brightness enhancement film 142 is provided on the first UV cross-linker 146. The brightness enhancement film 142 may be a high molecular weight film including the organic particles 79 having a core shell structure and has a difference of refraction rate between the elongated direction and a direction that is perpendicular to the elongated direction.

The elongated high molecular weight film having organic particles 79 with a core shell structure has reflection-polarization properties. That is, the reflection-polarization properties, resulting from properties, of the organic particles 79 allow for the transmission of P waves and reflect S waves.

The brightness enhancement film 142 allows for the transmission of P waves of light to the display unit 130 and reflects S waves of light for recycling. The reflected S waves are rebounded by the reflection film 160 and partially turned into P waves. The P waves of the rebounded light transmit the brightness enhancement film 142 and the S waves of the rebounded light are reflected again by the brightness enhancement film 142. The partial reflection and transmission is repeated to increase the amount of P waves provided or transmitted to the display unit 130, which increases or enhances brightness of the LCD.

Next, a second UV cross-linker 147 is dropped or provided on the brightness enhancement film 142 and uniformly distributed.

As shown in FIG. 41A, for example, the second UV cross-linker 147 may be uniformly coated on the diffusion film 141 by a spin coating technique. The second UV cross-linker 147 may be uniformly coated on the diffusion film 141 by a blading technique using a roller 55, as shown in FIG. 41A. It is understood that the coating techniques are not limited to the spin coating or blading techniques.

Figure 42:
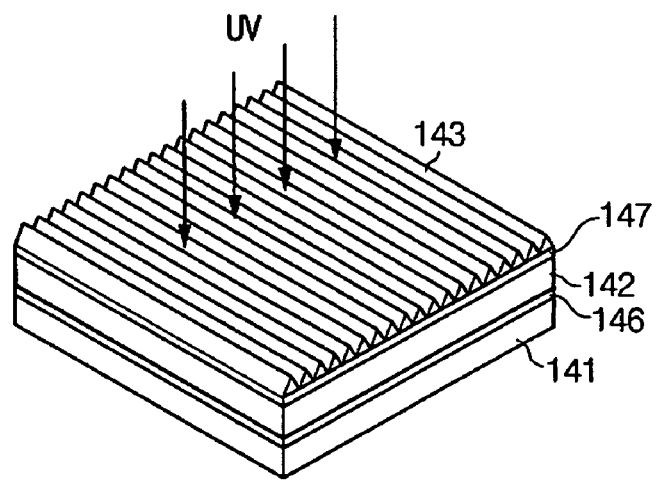

Referring to FIG. 42, a prism film 143 is provided on the second UV cross-linker 147. The first and second UV cross-linkers 146 and 147 are illuminated by UV rays to bond or connect the diffusion film 141 and the brightness enhancement film 142 with the first UV cross-linker 146 and to bond or connect the brightness enhancement film 142 and the prism film 143 with the second UV cross-linker 147.

The waviness or unevenness of the optical film unit 140 caused by the films 141, 142, and 143 having different expansion rates with respect to environmental conditions, such as temperature and humidity, is prevented or substantially reduced because the diffusion film 14, the brightness enhancement film 142, and the prism film 143 are tightly adhered or connected with each other.

According to the present embodiment, the first and second UV cross-linker 146 and 147 may be simultaneously illuminated by UV rays at once to bond or connect together the diffusion film 141, the brightness enhancement film 142, and the prism film 143. However, it is understood that the second UV cross-linker 147 may be coated or applied after the first UV cross-linker 146 is illuminated by UV rays. The prism film 143 is then disposed or provided on the second UV cross-linker 147 and the second UV cross-linker 147 is illuminated by UV rays to bond or connect the brightness enhancement film 142 and the prism film 143.

For example, an optical film unit having a single body structure may be manufactured by roll to roll process.

The above described embodiment of the invention provide a brightness enhancement film which has a high molecular weight film and a high molecular weight resin layer having a hexagonal lattice structure. Accordingly, since the brightness enhancement film may include a single layer or several layers, the brightness enhancement film is thin and the manufacturing process is simple, as compared with conventional brightness enhancement films.

The embodiment of the invention discussed above also provide for a brightness enhancement film made of a photonic colloidal layer having photonic colloidal particles which form a predetermined lattice. Accordingly, since the brightness enhancement film may include a single layer or several layers, the brightness enhancement film, made of the photonic colloidal layer, is thin and the manufacturing process is simple, as compared with conventional brightness enhancement films.

The embodiment of the invention discussed above provide for a brightness enhancement film made of a high molecular weight film having metal ion particles that form a predetermined lattice. Accordingly, since the brightness enhancement film may include a single layer or several layers, the brightness enhancement film made of a high molecular weight film having metal ion particles, is thin and the manufacturing process is simple as compared with conventional brightness enhancement films.

The embodiment of the invention provide for a brightness enhancement film made of a liquid crystal layer having encapsulated liquid crystal molecules that are aligned in a single direction. Accordingly, since the brightness enhancement film may include single layer or several layers, the brightness enhancement film, having encapsulated liquid crystal molecules, is thin and the manufacturing process is simple as compared with conventional brightness enhancement films.

The embodiment of the invention also provide for a brightness enhancement film made of a high molecular weight film having organic particles that form a core shell structure. Accordingly, since the brightness enhancement film may include a single layer or several layers, the width of the brightness enhancement film, made of the high molecular weight film having organic particles that form the core shell structure, is thin and the manufacturing process is simple as compared with conventional brightness enhancement films.

The waviness or unevenness of the optical film unit 140 caused by the films 141, 142, and 143 having different expansion rates with respect to environmental conditions, such as temperature and humidity, is prevented or substantially reduced because the diffusion film 14, the brightness enhancement film 142, and the prism film 143 are tightly adhered or connected with each other.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a brightness enhancement film for a liquid crystal display comprising:
   providing a solution of high molecular weight resin on a high molecular weight film;
   uniformly distributing the solution of high molecular weight resin on the high molecular weight film;
   drying the solution of high molecular weight resin to form a high molecular weight resin layer, wherein the high molecular weight resin layer has a hexagonal lattice structure; and
   drawing the high molecular weight film and the high molecular weight resin layer in a predetermined direction with heating.

2. The method of claim 1, wherein the high molecular weight film comprises a polycarbonate or a poly ethylene terephthalate material.

3. The method of claim 1, wherein the hexagonal lattice structure of the high molecular weight resin layer is approximately 10 nm to 800 nm thick.

4. The method of claim 1, wherein the solution of the high molecular weight resin is uniformly applied by a spin coating process or blading process.

5. The method of claim 1, wherein the high molecular weight resin layer comprises one of a polysulfone, a polymethylmethacrylate, a polystyrene, a polyvinylchloride, a polyvinylalcohol, a polynorbonene, a polymer formed by copolymerization of the above identified polymers, or a derivative thereof.

6. The method of claim 1, wherein the drawing of the high molecular weight film is performed at a temperature between a glass transition temperature of the high molecular weight film and a temperature that is greater than the glass transition temperature of the high molecular weight film by approximately 100° Celsius.

7. The method of claim 1, wherein the high molecular weight film and the high molecular weight resin layer are each elongated between approximately 1.1 to 8 times through the drawing with heating.

8. A brightness enhancement film for a liquid crystal display comprising:
   a high molecular weight film; and
   a high molecular weight resin layer formed on the high molecular weight film, wherein the high molecular weight resin layer has a hexagonal lattice structure and wherein the hexagonal lattice structure is positioned along an elongated direction of the brightness enhancement film.

9. The brightness enhancement film display of claim 8, wherein both the high molecular weight film and the high molecular weight resin layer are drawn in a predetermined direction with heating.

10. The brightness enhancement film display of claim 8, wherein the high molecular weight film comprises a polycarbonate or a poly ethylene terephthalate material.

11. The brightness enhancement film for a liquid crystal display of claim 8, wherein the hexagonal lattice structure of the high molecular weight resin layer is approximately 10 nm to 800 nm thick.

12. The brightness enhancement film of claim 8, wherein the high molecular weight resin layer comprises one of a polysulfone, a polymethylmethacrylate, a polystyrene, a polyvinylchloride, a polyvinylalcohol, a polynorbonene, a polymer formed by copolymerization of the above identified polymers, or a derivative thereof.

13. A method of manufacturing a liquid crystal display comprising:
   providing a first UV cross-linker on a diffusion film;
   uniformly distributing the first UV cross-linker on the diffusion film disposing a brightness enhancement film on the first UV cross-linker;
   providing a second UV cross-linker on the brightness enhancement film;
   uniformly distributing the second UV cross-linker on the brightness enhancement film;
   disposing a prism film on the second UV cross-linker;
   illuminating a UV ray at the first and second UV cross-linkers, wherein the brightness enhancement film has a high molecular weight film and a high molecular weight resin layer formed on the high molecular weight film, the high molecular weight film having a hexagonal lattice structure; and
   drawing the high molecular weiciht film and the high molecular weight resin layer in a predetermined direction with heating.

14. The method of claim 13, further comprising:
   uniformly applying the first and second UV cross-linkers on the diffusion film and the brightness enhancement film, respectively, by a spin coating or blading technique.

15. A liquid crystal display comprising:
   a display unit displaying images;
   a back light unit providing light to the display unit; and
   an optical film unit provided between the display unit, the optical film unit comprising a diffusion film, a prism film, and a brightness enhancement film, wherein the brightness enhancement film has a high molecular weight film and a high molecular weight resin layer formed on the high molecular weight film, the high molecular weight resin layer having a hexagonal lattice structure, and wherein the hexaqonal lattice structure is positioned along an elongated direction of the brightness enhancement film.

16. The liquid crystal display of claim 15, wherein the brightness enhancement film is provided on the diffusion film and the prism film is provided on the brightness enhancement film.

17. The liquid crystal display of claim 16, further comprising:
   a first UV cross-linker connecting together the diffusion film and the brightness enhancement film; and
   a second UV cross-linker connecting together the brightness enhancement film and the prism film.